(12) United States Patent
Takasu et al.

(10) Patent No.: US 11,358,583 B2
(45) Date of Patent: Jun. 14, 2022

(54) HYBRID VEHICLE

(71) Applicant: TOYOTA JIDOSHA KABUSHIKI KAISHA, Toyota (JP)

(72) Inventors: Yusuke Takasu, Sunto-gun (JP); Hiroshi Oyagi, Gotemba (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 650 days.

(21) Appl. No.: 16/295,245

(22) Filed: Mar. 7, 2019

(65) Prior Publication Data

US 2019/0276004 A1 Sep. 12, 2019

(30) Foreign Application Priority Data

Mar. 8, 2018 (JP) .............................. JP2018-041904

(51) Int. Cl.
| | |
|---|---|
| *B60W 20/13* | (2016.01) |
| *B60K 6/24* | (2007.10) |
| *B60W 10/26* | (2006.01) |
| *B60W 10/08* | (2006.01) |
| *B60W 10/30* | (2006.01) |

(Continued)

(52) U.S. Cl.
CPC .............. *B60W 20/13* (2016.01); *B60K 6/24* (2013.01); *B60W 10/08* (2013.01); *B60W 10/26* (2013.01); *B60W 10/30* (2013.01); *F02D 23/02* (2013.01); *F02D 41/1406* (2013.01); *B60W 2556/00* (2020.02); *F02B 39/10* (2013.01);

(Continued)

(58) Field of Classification Search
CPC ...... B60W 20/13; B60W 10/08; B60W 10/26; B60W 10/30; B60W 2556/00; B60K 6/24; F02D 23/02; F02D 41/1406; F02D 11/105; F02D 41/0007; F02D 2200/0625; F02B 39/10
See application file for complete search history.

(56) References Cited

U.S. PATENT DOCUMENTS

| | | | |
|---|---|---|---|
| 6,405,818 B1 * | 6/2002 | Anthony ............... | B60W 10/08 180/65.8 |
| 2007/0227792 A1 * | 10/2007 | Yonemori ............. | B60W 10/08 180/65.31 |
| 2018/0361844 A1 | 12/2018 | Kinzuka | |

FOREIGN PATENT DOCUMENTS

| | | |
|---|---|---|
| DE | 10 2016 208 238 A1 | 11/2017 |
| JP | 2005-240580 | 9/2005 |

(Continued)

*Primary Examiner* — Tyler J Lee
*Assistant Examiner* — Yufeng Zhang
(74) *Attorney, Agent, or Firm* — Oblon, McClelland, Maier & Neustadt, L.L.P.

(57) ABSTRACT

A hybrid vehicle includes an internal combustion engine, electric motors, an electric supercharger, a battery, and a controller. The controller determines whether to increase a total electric power supply amount to the electric motor and the electric supercharger from the battery based on a state of charge of the battery. When so determined, electric power supply promotion control is performed to increase the total electric power supply amount from the battery. In the electric power supply promotion control, the controller controls the electric power supply amount to the electric motors and the electric supercharger so as to maximize fuel save rate, which is the percentage of decrease of the fuel consumption of an internal combustion engine relative to an increase in the total electric power supply amount from the battery.

4 Claims, 15 Drawing Sheets

(51) Int. Cl.
*F02D 23/02* (2006.01)
*F02D 41/14* (2006.01)
*F02B 39/10* (2006.01)
*F02D 11/10* (2006.01)
*F02D 41/00* (2006.01)

(52) U.S. Cl.
CPC ........ *F02D 11/105* (2013.01); *F02D 41/0007* (2013.01); *F02D 2200/0625* (2013.01)

(56) References Cited

FOREIGN PATENT DOCUMENTS

| | | |
|---|---|---|
| JP | 2008-232069 | 10/2008 |
| JP | 2017-136974 | 8/2017 |
| WO | WO 2017/104033 A1 | 6/2017 |

* cited by examiner

HYBRID VEHICLE

FIELD

The present invention relates to a hybrid vehicle.

BACKGROUND

Conventionally, hybrid vehicles comprising an internal combustion engine and an electric motor and further comprising an electric supercharger for supercharging intake gas supplied to the internal combustion engine, have been known (for example, JP 2017-136974 A and JP 2008-232069 A).

The hybrid vehicle described in JP 2017-136974 A comprises a regenerative generator that converts the kinetic energy of a vehicle or an internal combustion engine into electric power and collects the converted electric power. When the state of charge (SOC) of the battery becomes equal to or greater than a predetermined value during operation of the regenerative generator, the regenerated electric power supplied by the regenerative generator is consumed by supplying electric power to the electric supercharger. In particular, in the hybrid vehicle described in JP 2017-136974 A, the electric power that can be consumed by the electric supercharger is calculated based on the ratio between the pressures in the upstream portion and the downstream portion of the electric supercharger, and when the calculated consumable electric power amount is low, for example, the electric power supply amount to devices other than the electric supercharger is increased, or the power generation amount of the regenerative generator is reduced, for example, by activating a mechanical brake.

SUMMARY

Technical Problem

In the case where the capacity of an electric motor of a hybrid vehicle is relatively small, when the required torque of the hybrid vehicle is greater than a certain degree, the required torque of the hybrid vehicle cannot be output by only the electric motor. Thus, in such hybrid vehicles, when the required torque is greater than a certain degree, the required torque is satisfied by driving the internal combustion engine.

In such hybrid vehicles, when the required torque of the hybrid vehicle is greater than a certain degree, in the case in which, for example, the state of charge of the battery is high and it is necessary to expend the electric power charged in the battery, the electric power charged in the battery can be reduced by supplying electric power to the electric motor in addition to supplying electric power to the electric supercharger. At this time, increasing the electric power supply amount to the electric supercharger decreases the pumping loss in the internal combustion engine, since the supercharging pressure increases. Thus, the thermal efficiency of the internal combustion engine increases, and as a result, the fuel consumption in the internal combustion engine can be reduced. On the other hand, increasing the electric power supply amount to the electric motor reduces the output torque of the internal combustion engine required to satisfy the required torque for the hybrid vehicle and consequently reduces the fuel consumption of the internal combustion engine. Thus, in order to reduce the fuel consumption in the internal combustion engine as much as possible at this time, it is necessary to properly distribute the electric power from the battery to the electric supercharger and the electric motor.

However, in JP 2017-136974 A, when it is necessary to increase the electric power supply amount from the battery, electric power is basically supplied to the electric supercharger. When electric supercharger cannot consume the regenerated electric power, the electric power is supplied to devices other than electric supercharger. Simply increasing the electric power supply to the electric supercharger does not necessarily reduce the fuel consumption in the internal combustion engine efficiently. Thus, there is room for improvement from the viewpoint of reducing fuel consumption in hybrid vehicles.

The present invention was made in view of the above problems and aims to provide a hybrid vehicle in which, when it is necessary to increase the electric power supply amount from the battery, the electric motor and the electric supercharger can be appropriately controlled to efficiently reduce fuel consumption.

Solution to Problem

The present invention was made so as to solve the above problem and has as its gist the following.

(1) A hybrid vehicle comprising an internal combustion engine and an electric motor as power sources, the hybrid vehicle further comprising:
   an electric supercharger for supercharging intake gas supplied to the internal combustion engine;
   a battery which is connected to the electric motor and the electric supercharger and which supplies electric power to the electric motor and the electric supercharger; and
   a controller for controlling the internal combustion engine, the electric motor, and the electric supercharger, wherein
   the controller determines whether or not it is necessary to increase a total power supply amount from the battery to the electric motor and the electric supercharge, based on a state of charge of the battery, and when it is determined that it is necessary to increase the total power supply amount from the battery, the controller performs power supply promotion control to increase the total power supply amount from the battery, and
   in the power supply promotion control, the controller controls a power supply amount to the electric motor and a power supply amount to the electric supercharger so as to maximize fuel save rate, which is the percentage of a reduction in fuel consumption of the internal combustion engine relative to the increase of the total power supply amount from the battery.

(2) The hybrid vehicle according to above (1), wherein, in the power supply promotion control, the controller calculates fuel save rate in the case in which a first operation is performed, wherein in the first operation, the output torque of the hybrid vehicle is maintained while the power supply amount to the electric motor is increased and the fuel supply amount to the internal combustion engine is decreased, as compared to when an operating point determined from at least the power supply amount to the electric supercharger, the power supply amount to the electric motor, and the fuel supply amount to the internal combustion engine is at a certain operating point, and fuel save rate in the case in which a second operation is performed, wherein in the second operation the output torque of the internal combustion engine is maintained while the power supply amount to the electric supercharger is increased and the fuel supply amount to the internal combustion engine is decreased, as compared to when the operating point is at the certain operating point;

executes updated operating point calculation control only once or a plurality of times to calculate a point to which the operating point reaches when the operation, in which the calculated fuel save rate is greatest, is executed as an updated operating point; and controls the electric motor, the electric supercharger, and the internal combustion engine so as to achieve the power supply amount to the electric motor, the power supply amount to the electric supercharger, and the fuel supply amount to the internal combustion engine at the ultimately calculated updated operating point.

(3) The hybrid vehicle according to above (2), wherein in the power supply promotion control, updated operating point calculation control is repeatedly executed until the total power supply amount from the battery at the updated operating point exceeds a limit value, and the internal combustion engine, the electric motor, and the electric supercharger are controlled to achieve a power supply amount to the electric super charger, a power supply amount to the electric motor, and a fuel supply amount to the internal combustion engine at an operating point one operating point prior to the ultimately calculated updated operating point.

(4) The hybrid vehicle according to any one of above (1) to (3), wherein when the controller determines that an increase of the total power supply amount from the battery is not necessary and when a required torque of the hybrid vehicle is not greater than a predetermined value, the internal combustion engine is stopped and the hybrid vehicle is driven by only the electric motor, and even when the controller determines that it is necessary to increase the total power supply amount from the battery, when the required torque of the hybrid vehicle is not greater than the predetermined value, the internal combustion engine is stopped and the hybrid vehicle is driven by only the electric motor.

Advantageous Effects of Invention

According to the present invention, there is provided a hybrid vehicle which can appropriately control the electric motor and the electric supercharger and which can sufficiently reduce the fuel consumption of the internal combustion engine when it is necessary to increase the amount of electric power supplied from the battery to the outside.

DESCRIPTION OF EMBODIMENTS

Figure 1:
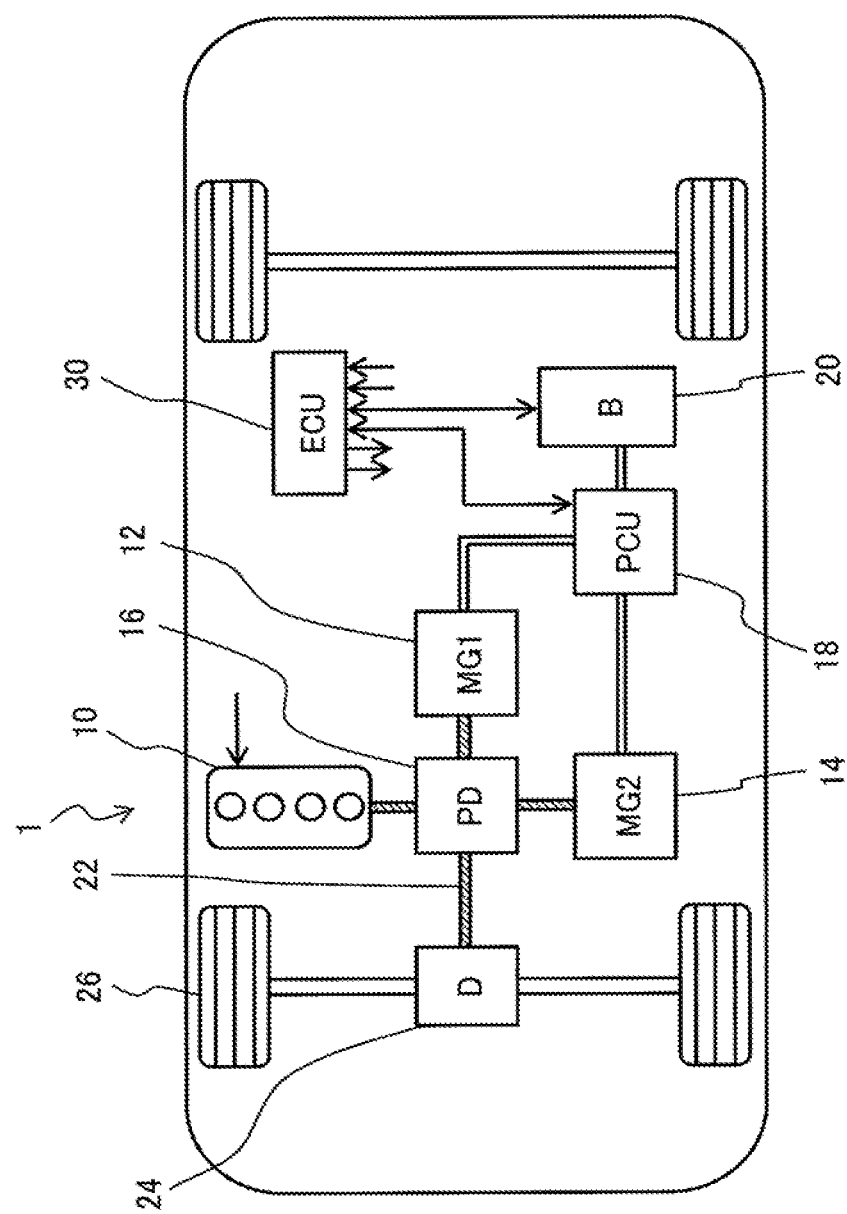
FIG. 1 is a view schematically showing the configuration of a hybrid vehicle according to a first embodiment.

The embodiments of the present invention will be described in detail below with reference to the drawings. In the following description, the same elements are assigned the same reference numerals.

<Vehicle Configuration>

FIG. 1 is a view schematically showing the configuration of a hybrid vehicle 1 according to a first embodiment. As shown in FIG. 1, the vehicle 1 comprises an internal combustion engine 10, a first motor-generator 12, a second motor-generator 14, and a power divider mechanism 16. Additionally, the vehicle 1 comprises a power control unit (PCU) 18 which is electrically connected to the first motor-generator 12 and the second motor-generator 14, a battery 20 which is electrically connected to the PCU 18, and an electronic control unit (ECU) 30.

The internal combustion engine 10 is a motor that makes a fuel such as gasoline or light oil burn in the engine and converts the thermal energy of a combustion gas into mechanical energy. The output of the internal combustion engine 10 is controlled by adjusting the amount of fuel and air supplied to the internal combustion engine 10. The output shaft (crankshaft) of the internal combustion engine 10 is mechanically connected to the power divider mechanism 16 and the power generated by the internal combustion engine 10 is input to the power divider mechanism 16.

The input/output shaft of the first motor-generator 12 is mechanically connected to the power divider mechanism 16 and the first motor-generator 12 is electrically connected to the PCU 18. The first motor-generator 12 is, when supplied with electrical power from the PCU 18, driven by this electric power to output power to the power divider mechanism 16. Thus, at this time, the first motor-generator 12 functions as an electric motor.

On the other hand, when the power from the power divider mechanism 16 is input to the first motor-generator 12, the first motor-generator 12 is driven by this power to generate electric power. The generated electric power is supplied to the battery 20 via the PCU 18 to charge the battery 20. Thus, at this time, the first motor-generator 12 functions as a generator. Note that the first motor-generator 12 may be a generator that does not function as an electric motor.

The input/output shaft of the second motor-generator 14 is mechanically connected to the power divider mechanism 16 and the second motor-generator 14 is electrically connected to the PCU 18. The second motor-generator 14 is, when supplied with electric power from the PCU 18, driven by this electric power to output power to the power divider mechanism 16. Thus, at this time, the second motor-generator 14 functions as an electric motor.

On the other hand, when the power from the power divider mechanism 16 is input to the second motor-generator 14, the second motor-generator 14 is driven by this power to generate electric power. The generated electric power is supplied to the battery 20 via the PCU 18 to charge the battery 20. Thus, at this time, the second motor-generator 14 functions as a generator. Note that the second motor-generator 14 may be an electric motor that does not function as a generator.

The power divider mechanism 16 is mechanically connected to the internal combustion engine 10, the first motor-generator 12, and the second motor-generator 14. Additionally, the power divider mechanism 16 is connected to the driveshaft 22 and the driveshaft 22 is connected to the wheels 26 via the differential 24. In particular, in the present embodiment, the power divider mechanism 16 comprises a planetary gear mechanism. In the planetary gear mechanism, for example, a sun gear is connected to the input/output shaft of the first motor-generator 12, a planetary gear is connected to the output shaft of the internal combustion engine 10, and a ring gear is connected to the input/output shaft of the second motor-generator 14.

The power divider mechanism 16 is configured to output the power input to the power divider mechanism 16 from any one of the internal combustion engine 10, the first motor-generator 12, the second motor-generator 14, and the driveshaft 22, which are connected to the power divider mechanism 16, to at least one of these elements. Thus, when, for example, power is input from the internal combustion engine 10 to the power divider mechanism 16, this power is output to at least one of the first motor-generator 12, the second motor-generator 14, and the driveshaft 22. Likewise, when power is input from the first motor-generator 12 to the power divider mechanism 16, this power is output to at least one of the internal combustion engine 10, the second motor-generator 14, and the driveshaft 22. Additionally, when power is input from the second motor-generator 14 to the power divider mechanism 16, this power is output to at least one of the internal combustion engine 10, the first motor-generator 12, and the driveshaft 22.

The PCU 18 comprises an inverter, a DC/DC converter, etc., and is electrically connected to the first motor-generator 12, the second motor-generator 14, and the battery 20. The PCU 18 controls the first motor-generator 12, the second motor-generator 14, and the battery 20, converts the electric power supplied from the battery 20 to the motor-generators 12 and 14, and converts the electric power supplied from the motor-generators 12 and 14 to the battery 20.

The battery 20 is electrically connected to the PCU 18 and stores electric power. When the first motor-generator 12 or the second motor-generator 14 is driven by power input from the power divider mechanism 16, the battery 20 is charged via the PCU 18. On the other hand, when power is output to the power divider mechanism 16 from the first motor-generator 12 or the second motor-generator 14, electric power is supplied from the battery 20 via the PCU 18 to the first motor-generator 12 or the second motor-generator 14.

The ECU 30 is configured from a digital computer and comprises RAM (Random Access Memory), ROM (Read-Only Memory), a CPU (microprocessor), input ports, and output ports, which are all connected to each other via bidirectional busses. The input ports and output ports of the ECU 30 are connected to the various actuators and sensors of the internal combustion engine 10, the PCU 18, the battery 20, etc. The output signals of the various sensors of the internal combustion engine 10, the PCU 18, and the battery 20 are input to the ECU 30. Additionally, the ECU 30 outputs control signals to the various actuators of the internal combustion engine 10, the PCU 18, and the battery 20. Thus, the various actuators of the internal combustion engine 10, the PCU 18, and the battery 20 are controlled by the ECU 30.

In the vehicle 1 configured in this way, when a part or all of the power obtained by the internal combustion engine 10 is input to the first motor-generator 12 or the second motor-generator 14, electric power can be generated by the first motor-generator 12 or the second motor-generator 14. The electric power obtained from such power generation may charge the battery 20 via the PCU 18, and may be supplied to either the first motor-generator 12 or the second motor-generator 14, whichever is not performing power generation. Thus, the vehicle 1 is configured so as to be able to charge the battery 20 by the electric power generated by the output of the internal combustion engine 10. Furthermore, when a part or all of the power obtained from the internal combustion engine 10 is input to the driveshaft 22, the wheels 26 can be rotated by this power.

Furthermore, the vehicle 1 is configured so as to be able to drive the first motor-generator 12 or the second motor-generator 14 by the electric power supplied from the battery 20. The power obtained by driving the first motor-generator 12 or the second motor-generator 14 can be input to the internal combustion engine 10. Thus, it is possible to start the internal combustion engine 10, when stopped, using such power. Furthermore, when the power obtained by driving the first motor-generator 12 or the second motor-generator 14 is input to the driveshaft 22, the wheels 26 can be rotated by such power.

Note that, in the present embodiment, the vehicle 1 comprises two motor-generators 12 and 14. However, it is not necessarily essential for the vehicle to comprise two motor-generators 12 and 14. The vehicle 1 may include only a single motor-generator.

<Configuration of Internal Combustion Engine>

Figure 2:
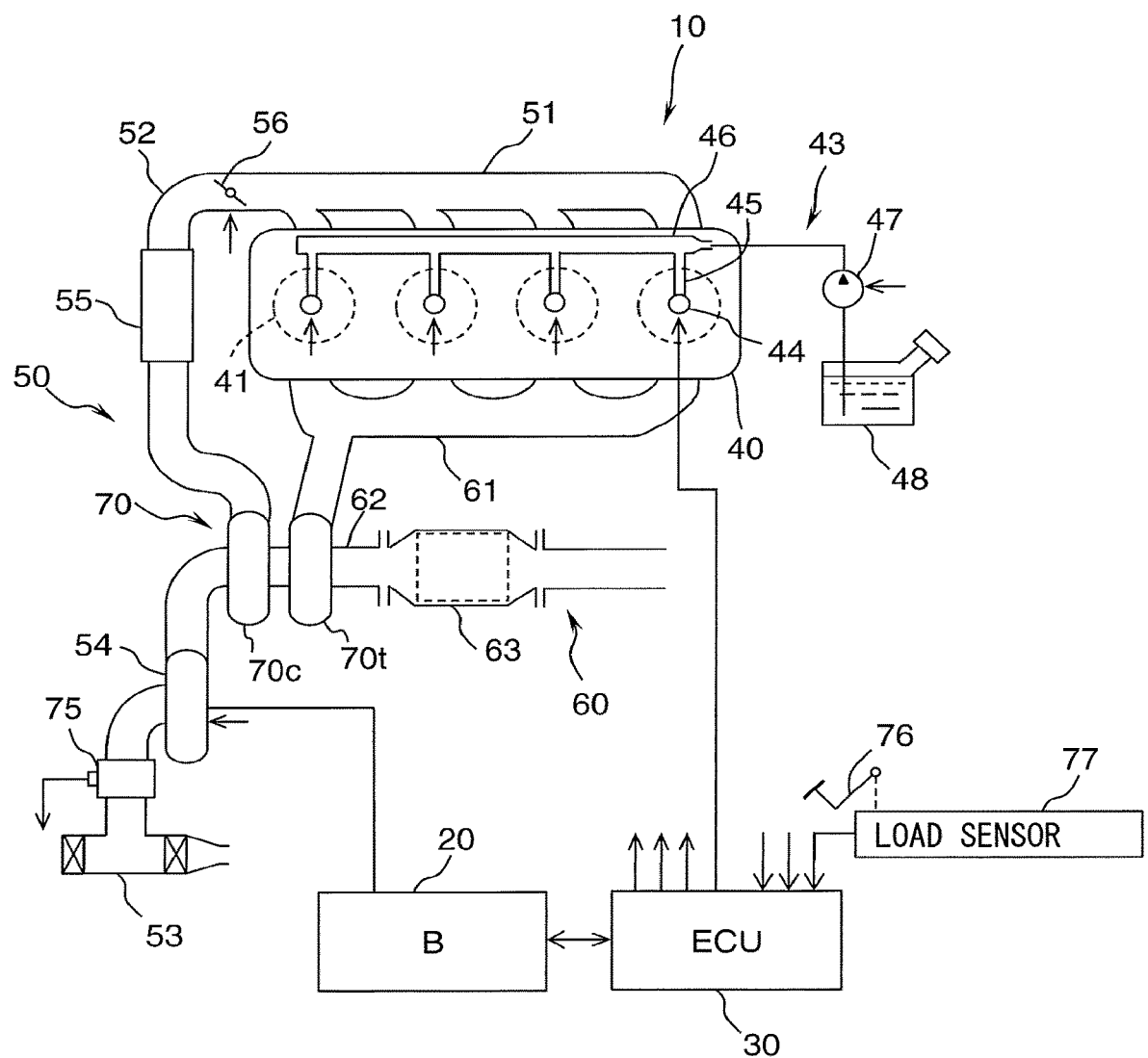
FIG. 2 is a view schematically showing the configuration of an internal combustion engine mounted in the hybrid vehicle.

FIG. 2 is a view schematically showing the configuration of the internal combustion engine 10 installed in the hybrid vehicle 1. As shown in FIG. 2, the internal combustion engine 10 comprises an engine body 40, a fuel supply device 43, an intake system 50, and an exhaust system 60. The engine body 40 comprises a plurality of cylinders 41. Combustion chambers for combusting air-fuel mixture are formed inside the respective cylinders 41. Spark plugs (not shown) for igniting the air-fuel mixture inside the combustion chambers of the respective cylinders 41 may be provided in the respective cylinders 41.

The fuel supply device 43 comprises fuel injection valves 44, delivery pipes 45, a fuel supply pipe 46, a fuel pump 47, and a fuel tank 48. The fuel injection valves 44 are arranged in the engine body so as to directly inject fuel into the combustion chamber of each of the cylinders 41. The fuel injection valves 44 are connected to the fuel tank 48 via the delivery pipes 45 and the fuel supply pipe 46. A fuel pump 47 for pumping the fuel in the fuel tank 48 is arranged in the fuel supply pip 46. The fuel pumped by the fuel pump 47 is supplied to the delivery pipes 45 via the fuel supply pipe 46, and is directly injected into the combustion chambers from the fuel injection valves 44 when the fuel injection valves 44 open.

The intake system 50 comprises an intake manifold 51, an intake pipe 52, an air cleaner 53, a compressor 70c of an exhaust turbocharger 70, an electric supercharger 54, an intercooler 55, and a throttle valve 56. Each of the cylinders 41 communicates with the intake manifold 51 via intake ports, and the intake manifold 51 communicates with the air cleaner 53 via the intake pipe 52.

The electric supercharger 54, which compresses and discharges intake air flowing through the intake pipe 52, is provided in the intake pipe 52. The electric supercharger 54 is connected to the battery 20 and is driven by the electric power supplied from the battery 20. The electric supercharger 54 can increase the pressure of intake air as the supplied electric power increases.

The compressor 70c of the exhaust turbocharger 70 and the intercooler 55 for cooling the air compressed by the compressor 70c are further provided in the intake pipe 52. The intercooler 55 is arranged downstream of the compressor 70c in the direction of flow of the intake air. The throttle valve 56 is arranged in the intake pip 52 between the intercooler 55 and the intake manifold 51. The throttle valve 56 can change the opening area of the intake passage by being rotated.

The exhaust system 60 comprises an exhaust manifold 61, an exhaust pipe 62, a turbine 70t of the exhaust turbocharger 70, and an exhaust aftertreatment device 63. Each of the cylinders 41 communicates with the exhaust manifold 61 via an exhaust port, and the exhaust manifold 61 communicates with the exhaust pipe 62. The turbine 70t of the exhaust turbocharger 70 is provided in the exhaust pipe 63. The turbine 70t is rotationally driven by the energy of the exhaust gas. The compressor 70c and the turbine 70t of the exhaust turbocharger 70 are connected by a rotating shaft, and when the turbine 70t is rotationally driven, accordingly, the compressor 70c rotates, whereby the intake air is compressed. Furthermore, the exhaust aftertreatment device 63 is provided in the exhaust pipe 62 on the downstream side of the turbine 70t in the exhaust flow direction. The exhaust aftertreatment device 63 is a device for purifying the exhaust gas and discharging the same to the outside and comprises various exhaust gas purification catalysts for purifying harmful substances, a filter for collecting harmful substances, etc.

The ECU 30 is connected to various sensors. For example, an air flow meter 75 for detecting the flow rate of the intake air flowing through the intake pipe 52 is provided in the intake pipe 52, and the ECU 30 is connected to the air flow meter 75. Furthermore, the hybrid vehicle 1 comprises a load sensor 77, the output current of which varies in accordance with the output of an accelerator pedal 76, and the load sensor 77 is also connected to the ECU 30.

The ECU 30 is connected to the various actuators of the internal combustion engine. In the example shown in FIG. 2, the ECU 30 is connected to the fuel injection valves 44, the fuel pump 47, the electric supercharger 54, and the throttle valve 56, and controls these actuators.

<Basic Vehicle Output Control>

Figure 3:
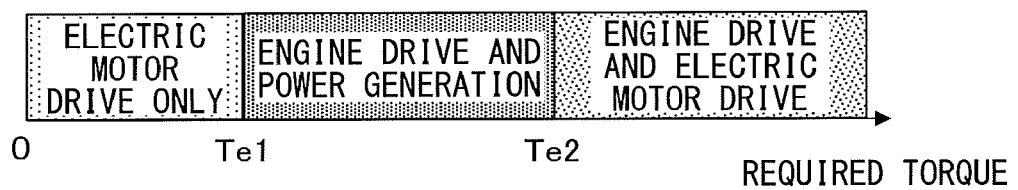
FIG. 3 is a view showing the relationship between required torque and operating conditions
Figure 4:
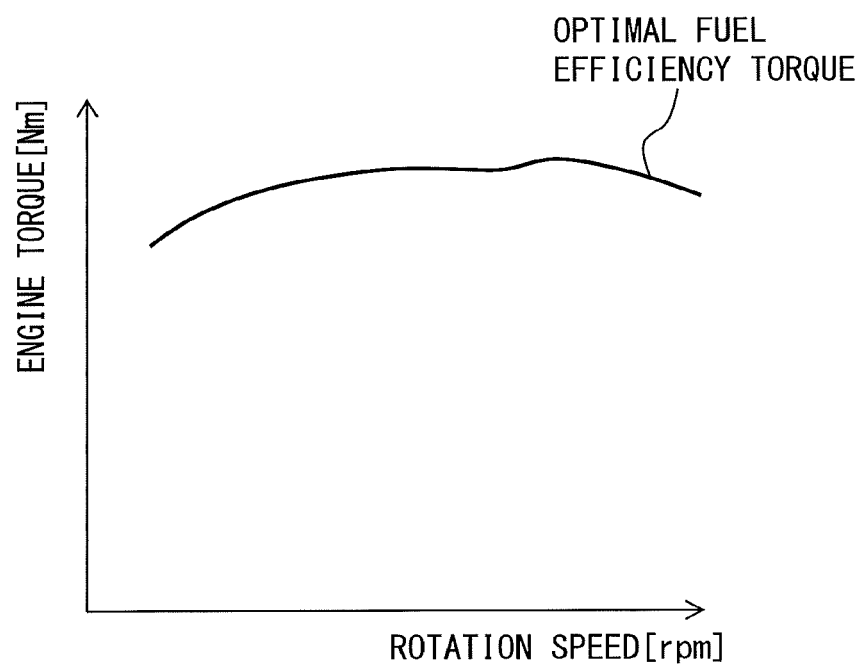
FIG. 4 is a view showing the engine torque at which fuel efficiency is best per engine rotational speed.

Next, basic operation control of the hybrid vehicle 1 will be described with reference to FIGS. 3 and 4. FIG. 3 is a view showing the relationship between required torque and operating conditions, and FIG. 4 is a view showing the engine torque at which fuel efficiency is best (hereinafter referred to as "optimal fuel efficiency torque") per engine rotational speed.

As shown in FIG. 3, in the present embodiment, the source of the drive force supplied to the hybrid vehicle 1 changes depending on the required torque calculated based on the output of the load sensor 77, i.e., depending on the required torque of the hybrid vehicle 1. In the example shown in FIG. 3, when the required torque is low and is less than Te1, the hybrid vehicle 1 is driven by only the motor-generators 12 and 14. Thus, when the required torque is less than Te1, the internal combustion engine 10 is stopped.

Thus, when the required torque of the hybrid vehicle is equal to or less than the predetermined value Te1, even if it is determined that it is necessary to increase the total electric power supply amount from the battery 20 or it is determined that an increase is not necessary, the internal combustion engine 10 is stopped and the hybrid vehicle 1 is driven only by the motor-generators 12 and 14.

On the other hand, in the hybrid vehicle 1 of the present embodiment, the capacities of the motor-generators 12 and 14 are not particularly high. Thus, when the required torque is an intermediate torque, which is equal to or greater than Te1, the required torque cannot be satisfied by only the motor-generators 12 and 14. Therefore, when the required torque of the hybrid vehicle 1 is equal to or greater than Te1, the internal combustion engine 10 is started, whereby the hybrid vehicle 1 is driven by the internal combustion engine 10.

In this regard, as can be seen in FIG. 4, at each engine speed, the optimal fuel efficiency torque is relatively high. Thus, when the required torque is an intermediate torque, which is between Te1 and Te2, if the internal combustion engine 10 is operated so that the output torque of the internal combustion engine 10 becomes the optimal fuel efficiency torque, the output torque of the internal combustion engine 10 becomes larger than the required torque of the hybrid vehicle 1. Therefore, when the required torque of the hybrid vehicle 1 is between Te1 and Te2, the internal combustion engine 10 is operated so that the output torque becomes the optimal fuel efficiency torque and the motor-generators 12 and 14 are driven by the surplus torque so as to generate electric power. As a result, the internal combustion engine 10 can be operated in a high fuel-efficiency state and surplus torque can be converted to electric power and stored.

Figure 5A:
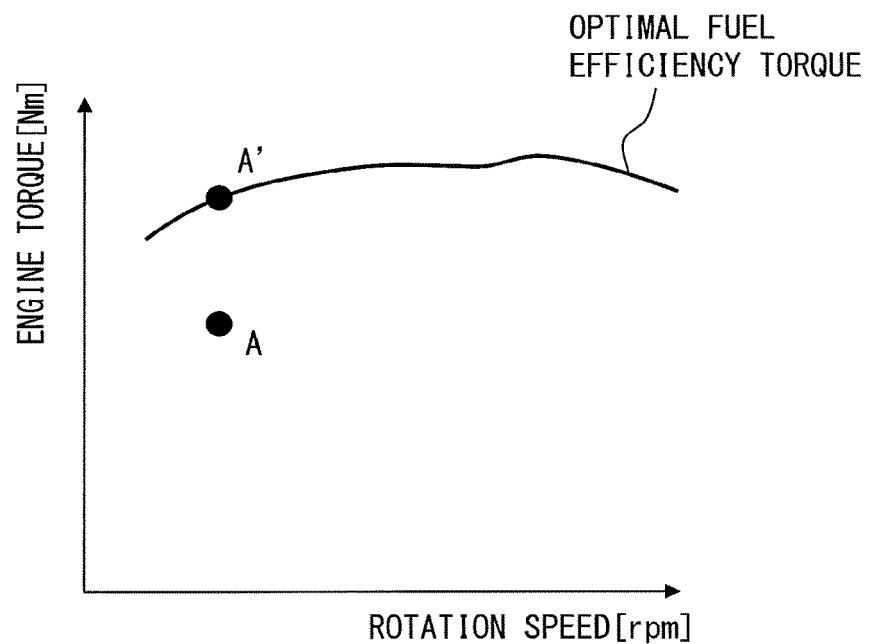
FIGS. 5A-5C are views showing the operating conditions of the hybrid vehicle when the required torque of the hybrid vehicle is intermediate.
Figure 5B:
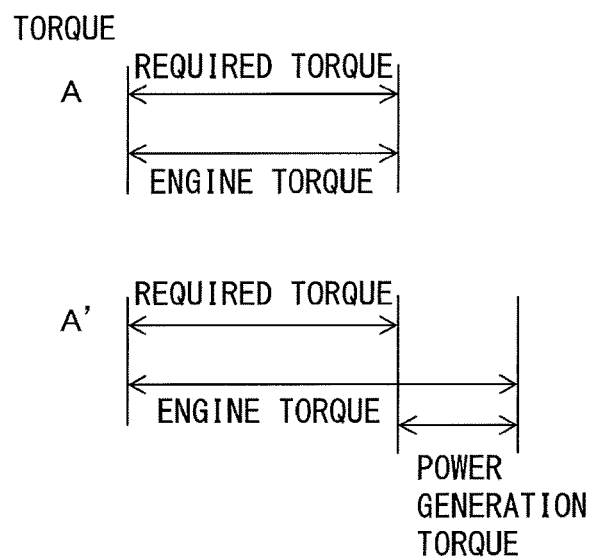
Figure 5C:
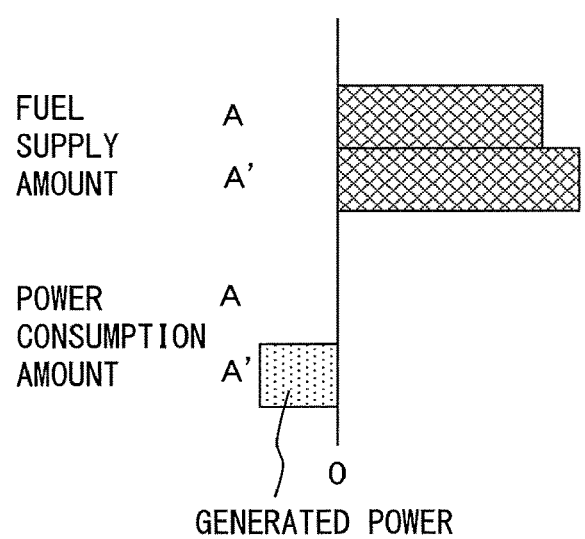

FIGS. 5A-5C shows the operating conditions of the hybrid vehicle 1 when the required torque of the hybrid vehicle 1 is intermediate. In particular, A in the drawing represents the case in which the internal combustion engine 10 is operated so as to make the output torque of the internal combustion engine 10 equivalent to the required torque of the hybrid vehicle 1 (the case in which operation is performed at operating point A). On the other hand, A' in the drawing represents the case in which the output torque of the internal combustion engine 10 is higher than the required torque of the hybrid vehicle 1 and thus electric power is generated using the surplus torque (the case in which operation is performed at operating point A'). Note that the operating points represent the operating conditions of the hybrid vehicle 1 determined from at least the electric power supply amount to the electric supercharger 54, the electric power supply amount to the motor-generators 12 and 14, and the fuel supply amount to the internal combustion engine 10.

As shown in FIG. 5A, when operation is performed at operating point A', the output torque of the internal combustion engine 10 is high as compared with the case in which operation is performed at operating point A. In particular, at operating point A', the internal combustion engine 10 is driven so that the output torque of the internal combustion engine becomes the optimal fuel efficiency torque.

Furthermore, as shown in FIG. 5B, at operating point A, the required torque of the hybrid vehicle 1 and the output torque of the internal combustion engine 10 are equal. On the other hand, at operating point A', the torque obtained by subtracting the torque used for power generation (power generation torque) in the motor-generators 12 and 14 from the output torque of the internal combustion engine 10 matches the required torque of the hybrid vehicle 1.

Additionally, the fuel supply amount of the internal combustion engine 10 (the fuel supply amount of each cycle) is basically proportional to the output torque of the internal combustion engine 10. Thus, as shown in FIG. 5C, the fuel supply amount at operating point A' is greater than the fuel supply amount at operating point A. In addition, at operating point A, the driving of the hybrid vehicle 1 by the motor-generators 12 and 14 and the supercharging by the electric supercharger 54 are not carried out. Thus, at operating point A, the electric power supply amounts to the motor-generators 12 and 14 and the electric supercharger 54 are substantially zero. On the other hand, at operating point A', electric power is generated by the motor-generators 12 and 14, and the electric power supply amount is a negative value.

Furthermore, when the required torque of the hybrid vehicle 1 is high and thus is equal to or greater than Te2, the hybrid vehicle 1 is driven by the motor-generators 12 and 14 in addition to the internal combustion engine 10. In this case, the internal combustion engine 10 is operated so that the output torque thereof is as close to optimal fuel efficiency torque as possible, and the motor-generators 12 and 14 are driven to generate output torque corresponding to the difference between the required torque and the optimal fuel efficiency torque. Furthermore, when the required torque further increases and thus even if the output torque of the motor-generators 12 and 14 is maximum, the required torque cannot be satisfied, the internal combustion engine 10 is operated so that the output torque becomes higher than the optimal fuel efficiency torque.

<Problems when Requesting SOC Reduction>

In this regard, when the SOC (State of Charge), which is ratio of the current charge capacity to the full charge capacity of the battery 20, is low, electric power is generated by the motor-generators 12 and 14, and the electric power obtained from the power generation can be used to charge the battery 20. However, since the amount of electric power that can be charged to the battery 20 is limited, when the SOC is high, the battery 20 cannot be further charged, and thus electric power cannot be generated by the motor-generators 12 and 14 anymore.

In this regard, when the required torque of the hybrid vehicle 1 is the intermediate torque, which is equal to or greater than Te1 and less then Te2, as described above, electric power is basically generated by the motor-generators 12 and 14. However, when the SOC is high, electric power cannot be generated by the motor-generators 12 and 14. Thus, when the required torque of the hybrid vehicle 1 is intermediate, it is necessary to operate the internal combustion engine 10 at not operating point A' at which the fuel efficiency is optimal, but at operating point A.

When the hybrid vehicle 1 travels downhill for a long period of time in a state in which SOC is high, the hybrid vehicle 1 cannot perform regenerative power generation, and thus it is necessary that the hybrid vehicle 1 be decelerated by the brake system. Thus, in such a case, energy which can be regenerated becomes heat and is unnecessarily consumed.

In order to prevent such a situation, reducing the SOC of the battery 20 in advance before the hybrid vehicle 1 travels downhill for a long period of time has been considered. By reducing the SOC of the battery 20 in advance in this way, when the hybrid vehicle 1 is traveling downhill, the battery 20 can be charged using regenerated energy, enabling an increase in the fuel efficiency of the hybrid vehicle 1.

Fuel efficiency can be increased in this manner for the same reason even in the event where the required torque to the hybrid vehicle 1 is intermediate when reducing the SOC of the battery 20 in advance. In other words, even when the required torque of the hybrid vehicle 1 is intermediate, it is necessary to generate the torque by the motor-generators 12 and 14 and to operate the internal combustion engine 10 at a torque lower than the optimal fuel efficiency torque, in order to reduce the SOC. Thus, when the SOC of the battery 20 is reduced in advance, the fuel efficiency in the internal combustion engine 10 reduces. However, if electric power can be generated with regenerative energy while traveling downhill, it is possible to charge the regenerative energy in excess of the reduction of fuel efficiency of internal combustion engine 10.

Other than the case in which it is expected that the hybrid vehicle 1 will be subsequently traveling downhill, it may be necessary to reduce the SOC of the battery 20 while the required torque to the hybrid vehicle 1 is intermediate. When it is necessary to reduce the SOC of the battery 20 in this way, i.e., when it is necessary to increase the total electric power supply amount from the battery 20 to the motor-generators 12 and 14 or the electric supercharger 54, the overall fuel efficiency in hybrid vehicle 1 will at least temporarily reduce, in order to satisfy this requirement. Thus, from the viewpoint of suppressing reduction of the fuel efficiency of hybrid vehicle 1, in such a case, it is necessary to minimize the reduction of the overall fuel efficiency of the hybrid vehicle 1.

<SOC Reduction Method>

In this regard, when the required torque of the hybrid vehicle 1 is equal to or greater than Te1 and thus the required torque cannot be satisfied unless the internal combustion engine 10 is operated, two methods are mainly considered as the method of decreasing the SOC of the battery 20.

The first method is a method to increase the electric power supply amount to the motor-generators 12 and 14 while decreasing the fuel supply amount to the internal combustion engine 10, whereby the output torque of the hybrid vehicle 1 is maintained (hereinafter, such an operation shall be referred to as the "first operation"). The first method will be specifically described below with reference to FIGS. 6A-6C.

Figure 6A:
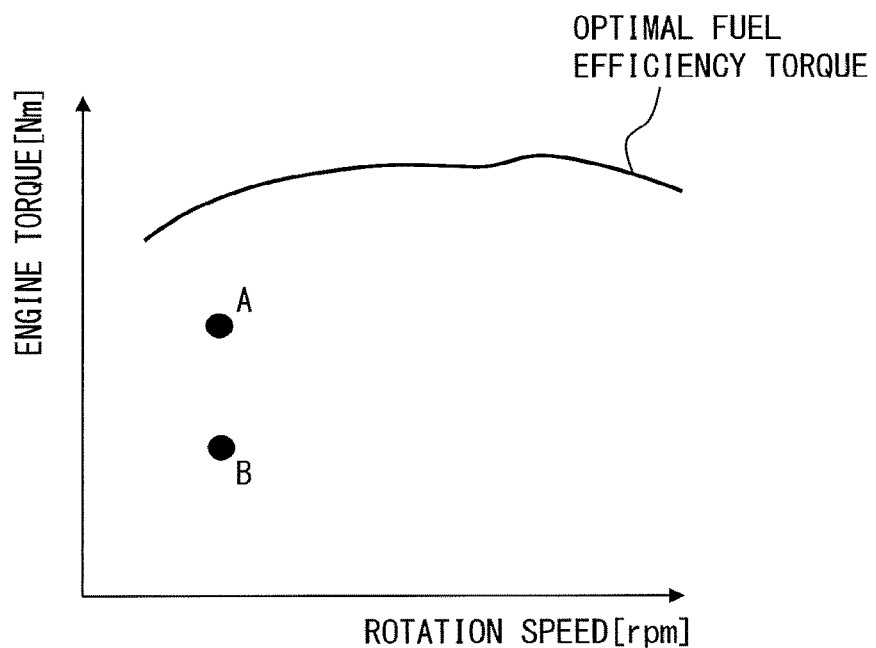
FIGS. 6A-6C are views, which are similar to FIGS. 5A-5C respectively, showing the operating conditions of the hybrid vehicle when the required torque of the hybrid vehicle is intermediate.
Figure 6B:
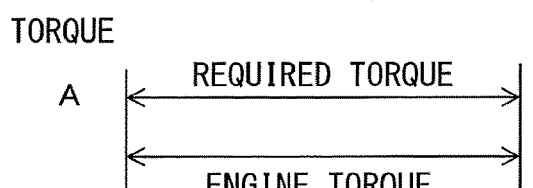
Figure 6C:
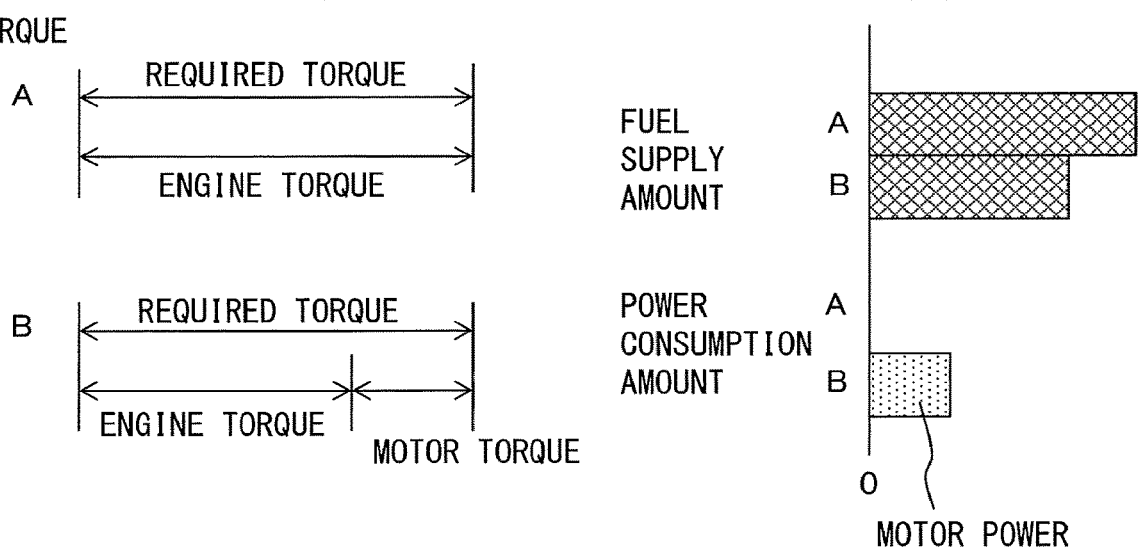

FIGS. 6A-6C are views, similar to FIGS. 5A-5C respectively, showing the operating conditions of the hybrid vehicle 1 in the case in which the required torque of the hybrid vehicle 1 is intermediate. In particular, operating point A in the drawing represents the case in which the internal combustion engine 10 is operated so that the output torque of the internal combustion engine 10 is equal to the required torque of the hybrid vehicle 1 (the case in which operation is performed at operating point A), and is the same as A of FIG. 5A. Operating point B in the drawing represents the case in which, contrary to operating point A, the output torque of the internal combustion engine 10 is lower than the required torque of the hybrid vehicle 1, and the torque shortage is supplemented by the output torque of the motor-generators 12 and 14 (the case at which operation is performed at operating point B).

As shown in FIG. 6A, when operation is performed at operating point B, the output torque of the internal combustion engine 10 is lower than the case in which operation is performed at operating point A. Furthermore, as shown in FIG. 6B, at operating point A, the required torque of the hybrid vehicle 1 and the output torque of the internal combustion engine 10 are equal to each other. On the other hand, at operating point B, the torque obtained by adding the output torque of the internal combustion engine 10 and the output torque of the motor-generators 12 and 14 matches the required torque of the hybrid vehicle 1.

Additionally, since the output torque of the internal combustion engine 10 at operating point B is lower than the output torque of the internal combustion engine 10 at operating point A, as shown in FIG. 6C, the fuel supply amount at operating point B is less than the fuel supply amount at operating point A. Further, at operating point A, the motor-generators 12 and 14 and the electric supercharger 54 are not driven, whereas at the operating point B, the driving of the hybrid vehicle 1 is performed by the motor-generators 12 and 14. Thus, the electric power supply amount at operating point B is greater than at operating point A.

The second method is a method to increase the electric power supply amount to the electric supercharger 54 while decreasing the fuel supply amount of the internal combustion engine 10, whereby the output torque of the internal combustion engine 10 is maintained (hereinafter, such an operation shall be referred to as the "second operation"). As a result of this method, the output torque of the hybrid vehicle 1 is maintained. The second method will be specifically described below with reference to FIGS. 7A-7C.

Figure 7A:
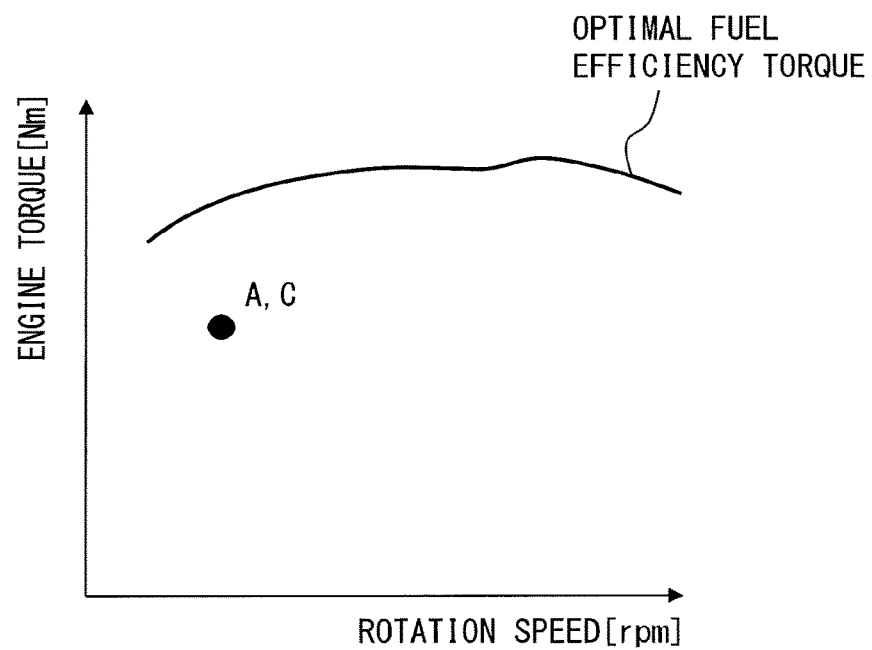
FIGS. 7A-7C are views, which are similar to FIGS. 5A-5C, showing the operating conditions of the hybrid vehicle when the required torque of the hybrid vehicle is intermediate.
Figure 7B:
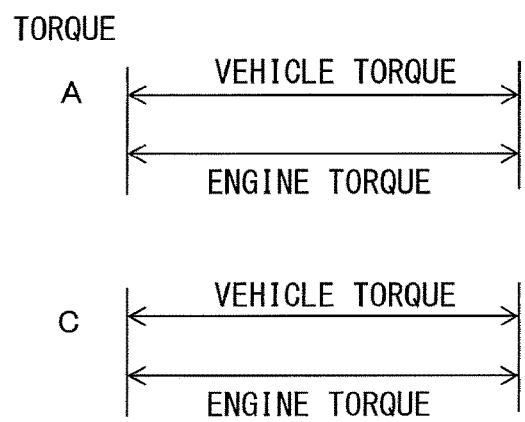
Figure 7C:
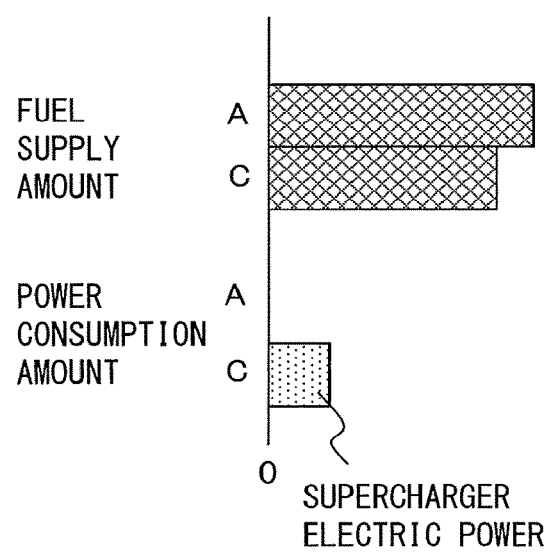

FIGS. 7A-7C are views, similar to FIGS. 5A-5C respectively, showing the operating conditions of the hybrid vehicle 1 when the required torque of the hybrid vehicle 1 is intermediate. In particular, in the drawing, operating point A is the same as A in FIGS. 5A and 6A. On the other hand, operating point C in the drawing represents the case in which, as compared to operating point A, the electric power supply amount to the electric supercharger 54 is increased and the fuel supply amount of the internal combustion engine 10 is decreased, whereby the output torque of the internal combustion engine 10 is maintained (the case in which operation is performed at operating point C).

As shown in FIG. 7A, the output torque when operation is performed at operating point C is equal to the output torque when operation is performed at operating point A. Furthermore, as shown in FIG. 7B, the required torque of the hybrid vehicle 1 and the output torque of the internal combustion engine 10 are equal to each other, in both the case in which operation is performed at operating point A and the case in which operation is performed at operating point C.

Additionally, at operating point C, electric power is supplied to the electric supercharger 54, whereby the intake gas supplied to the internal combustion engine 10 is supercharged. By performing supercharging by the electric supercharger 54 in this way, pumping loss decreases, and thus, thermal efficiency in the internal combustion engine increases. Thus, even when the fuel supply amount to the internal combustion engine 10 is lower than at operating point A, the output torque of the internal combustion engine 10 can be maintained. Thus, at operating point C, the electric power supply amount is increased instead of decreasing the fuel supply amount, as compared with operating point A.

In this way, at operating point B, although the fuel supply amount is less than at operating point A, the total amount of electric power supply from the battery 20 increases with respect to operating point A. Likewise, at operating point C, although the fuel supply amount is less than at operating point A, the total electric power supply amount from the battery 20 increases with respect to operating point A. Further, if the fuel save rate is defined as the percentage of the decrease in fuel supply amount relative to the increase in total electric power supply amount from the battery, the fuel save rate at operating point B and operating point C changes depending on operating point A and other engine operating conditions. Thus, operating point B may have a higher fuel save rate than operating point A, depending on operating point A and other engine operating conditions, while on the other hand, operating point A may have a higher fuel save rate than operating point B, depending on operating point A and other engine operating conditions.

<Search for Operating Point at which Fuel Save Rate Increases>

In the present embodiment, a target operating point at which fuel save rate is maximum is searched, and the electric supercharger 54, the motor-generators 12 and 14, and the internal combustion engine 10 are controlled so that the hybrid vehicle 1 is operated at the operating point at which fuel save rate is maximum. The method for searching for the target operating point at which the fuel save rate is maximum will be described below with reference to FIGS. 8 and 9.

Figure 8:
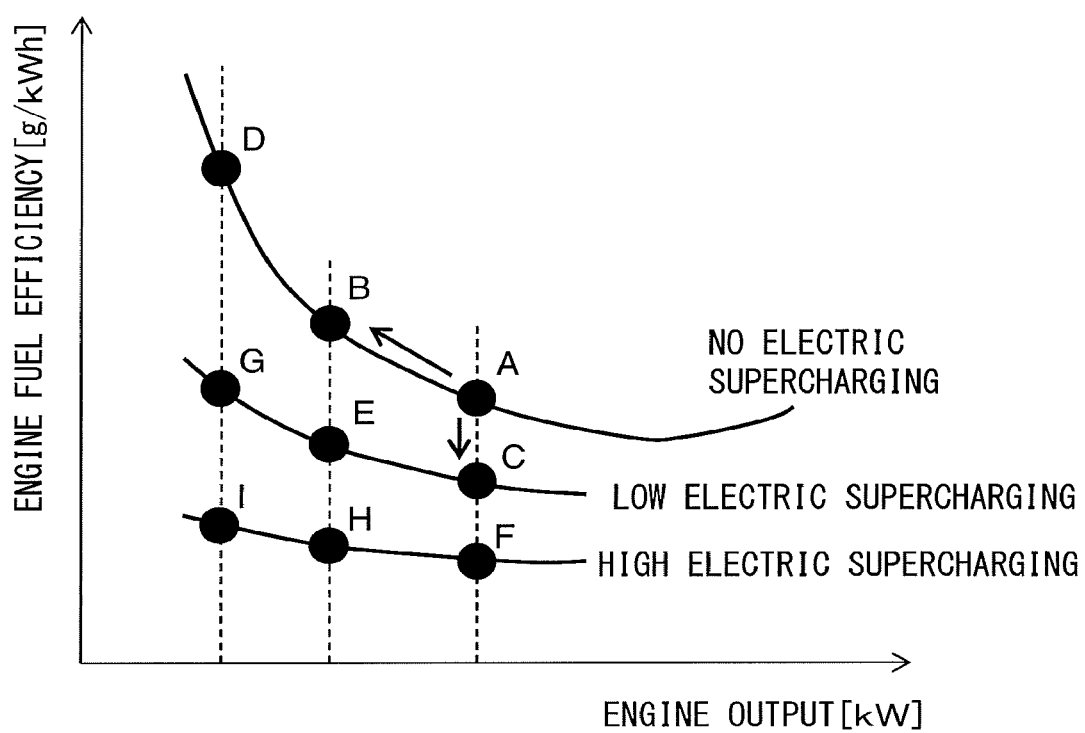
FIG. 8 is a view showing the relationship between the engine output, the degree of supercharging by the electric supercharger, and the efficiency of the internal combustion engine.

FIG. 8 is a view showing the relationship between the engine output, the degree of supercharging by the electric supercharger 54, and the fuel efficiency of the internal combustion engine 10. In FIG. 8, the plurality of solid lines represent the relationships when the electric power supply amount to the electric supercharger 54 differs. In this regard, the case in which the operating point of hybrid vehicle 1 is at operating point A when it is necessary to reduce SOC of battery 20 will be considered.

In this case, when the aforementioned first operation is performed, the electric power supply amount to the motor-generators 12 and 14 increases, whereby the output of the motor-generators 12 and 14 increases. At this time, the electric power supply amount to the electric supercharger 54 does not change. Assuming that the required output of the hybrid vehicle 1 has not changed, it is necessary to reduce the output of the internal combustion engine 10 by only increased amount of the output of the motor-generators 12 and 14. If the output of the internal combustion engine 10 is reduced, the output torque of the internal combustion engine 10 deviates from the optimal fuel efficiency torque, and thus the fuel efficiency of internal combustion engine 10 is reduced (the fuel supply amount per unit output increases). As a result, if the first operation is performed, the operating point of the hybrid vehicle 1 moves from A to B of FIG. 8. Furthermore, the fuel save rate when the operating point moves from A to B is calculated by dividing the decrease of the fuel supply amount to the internal combustion engine 10 by the increase of the electric power supply amount to the motor-generators 12 and 14.

On the other hand, if the aforementioned second operation is performed, the electric power supply amount to the electric supercharger 54 increases, whereby the supercharging pressure in the internal combustion engine 10 rises. If the supercharging pressure rises, pumping loss is reduced and thermal efficiency increases, and therefore the output of the internal combustion engine 10 can be maintained while the fuel supply amount of the internal combustion engine 10 decreases, whereby the fuel efficiency of the internal combustion engine 10 is improved. As a result, if the second operation is performed, the operating point of the hybrid vehicle 1 moves from A to C in FIG. 8. Furthermore, the fuel save rate when the operating point moves from A to C is calculated by dividing the decrease of the fuel supply amount to the internal combustion engine 10 by the increase of the electric power supply amount to the electric supercharger 54.

Further, the fuel save rate when the first operation is performed and the fuel save rate when the second operation is performed are compared and the operation point reached after performing the operation having the greater fuel save rate is calculated as an updated operating point (such control is referred to as updated operating point calculation control). Thereafter, the operating point reached when performing the first operation and the fuel save rate associated with the first operation are calculated on the basis of this updated operating point, and the operating point reached when performing the second operation and the fuel save rate associated with the second operation are calculated on the basis of this updated operating point. These fuel save rates are then compared again, and the operating point reached after performing the operation with the higher fuel save rate is calculated as the next updated operating point. Thereafter, the same operation is repeated.

Figure 9:
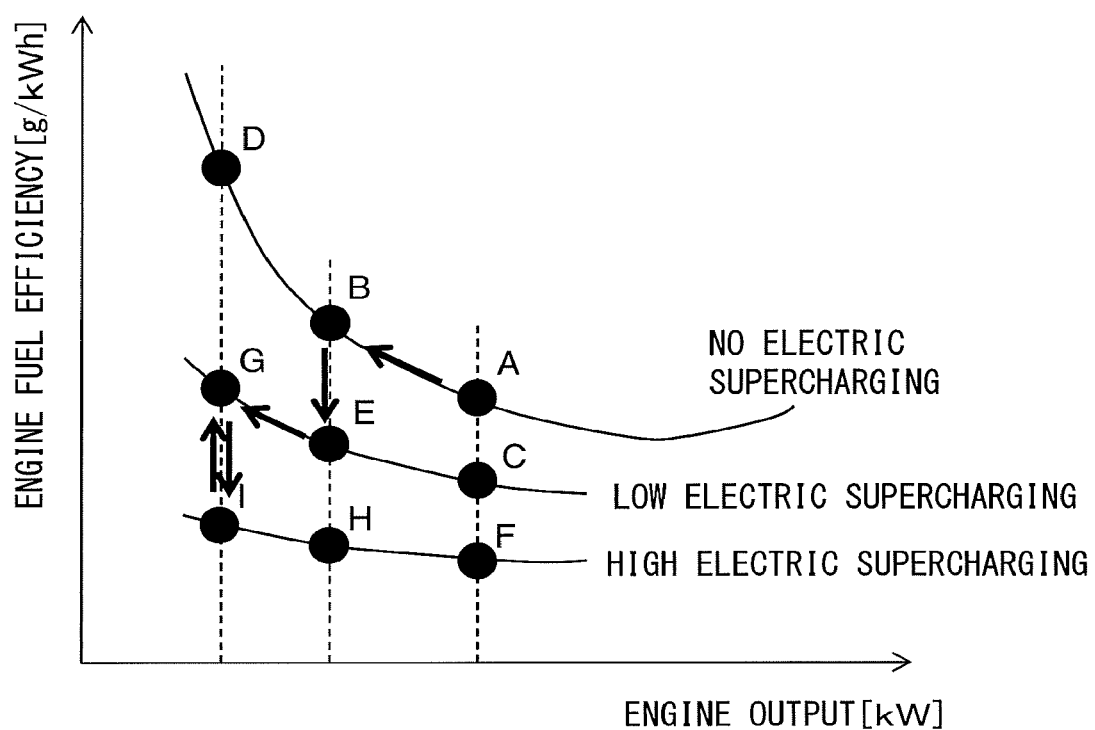
FIG. 9 is a view, similar to FIG. 8, showing the relationship between the output of the internal combustion engine and fuel efficiency.

FIG. 9 is a view, similar to FIG. 8, showing the relationship between the output of the internal combustion engine 10 and fuel efficiency. In the example shown in FIG. 9, as a result of the comparison between the case in which the first operation is performed from operating point A (when reaching operating point B) and the case in which the second operation is performed from operating point A (when reaching operating point C), the fuel save rate of the case in which the first operation is performed is higher. Thus, operating point B is calculated as the updated operating point from operating point A.

In the example shown in FIG. 9, next, as a result of the comparison between the case in which the first operation is performed from operating point B (when operating point D is reached) and the case in which the second operation is performed from operating point B (when operating point E is reached), the fuel save rate in the case in which the second operation is performed is higher. Thus, operating point E is calculated as the updated operating point from operating point B. In the example shown in FIG. 9, similarly, operating point G is calculated as the updated operating point from operating point E, and operating point I is calculated as the updated operating point from operating point G.

In this regard, if the first operation or the second operation is performed from a certain operating point, the total electric power supply amounts from the battery 20 to the motor-generators 12 and 14 and the electric supercharger 54 increase at the operating point which is reached as a result of performing the operation, as compared with the operating point before the operation. Thus, as the number of repetitive updates of the operating point increases by repeating the first operation or the second operation, the total electric power supply amount gradually increases. A limit value is set in advance for the total electric power supply amount. This limit value is set to, for example, an electric power supply amount at which the discharge current from the battery 20 reaches the current limit value.

Thus, if repeating the update of the operating point by repeating the updated operating point calculation control, the total electric power supply amount at the updated operating point will exceed the limit value. In the present embodiment, when the total electric power supply amount in the updated operating point, which is ultimately calculated, exceeds the limit value, the operating point that was calculated immediately before the ultimately calculated updated operating point is specified as the target operating point.

In the example shown in FIG. 9, though the total electric power supply amount at operating point G is equal to or less than the limit value, the value of the total electric power supply amount at operating point I exceeds the limit value. Thus, operating point G, which was calculated immediately before the ultimately calculated updated operating point I, is specified as the target operating point. Further, the electric supercharger 54, the motor-generators 12 and 14, and the internal combustion engine 10 are controlled so as to achieve the electric power supply amount to the electric supercharger 54, the electric power supply amount to the motor-generators 12 and 14, and fuel supply amount of the internal combustion engine 10 at the target operating point specified in this manner.

If target operating point is searched in this manner, the ultimately calculated target operating point is the operating point at which the fuel save rate is maximum among the operating points at which the total electric power supply amounts are identical. Thus, in the present embodiment, the electric power supply amount to the motor-generators 12 and 14 and the electric power supply amount to the electric supercharger 54 are controlled so that the fuel save rate is maximum. Further, according to the present embodiment, when it is necessary to increase the electric power supply amount from the battery 20 to the outside, by appropriately controlling the motor-generators 12 and 14 and the electric supercharger 54, it is possible to efficiently reduce the fuel consumption rate of the hybrid vehicle 1.

Note that in the embodiment described above, the target operating point is the operating point calculated immediately before the ultimately calculated updated operating point at which the total electric power supply amount exceeds the limit value. However, the target value of the total electric power supply amount may be set in advance, and the updated operating point which was ultimately calculated so that the total electric power supply amount exceeds a target value may be used as the target operating point.

<Correction According to Operating Conditions>

The relationship between the engine output, the degree of supercharging by the electric supercharger, and the fuel efficiency of the internal combustion engine 10 shown in FIG. 8 is not the same for all operating conditions, and changes depending on the operating conditions of the internal combustion engine 10. Specifically, these relationships change depending on, for example, the flow rate of intake gas in the intake passage constituted by the intake manifold 51 and the intake pipe 52, pumping loss, the degree of constant volume, the friction of the internal combustion engine 10, etc.

Figure 10:
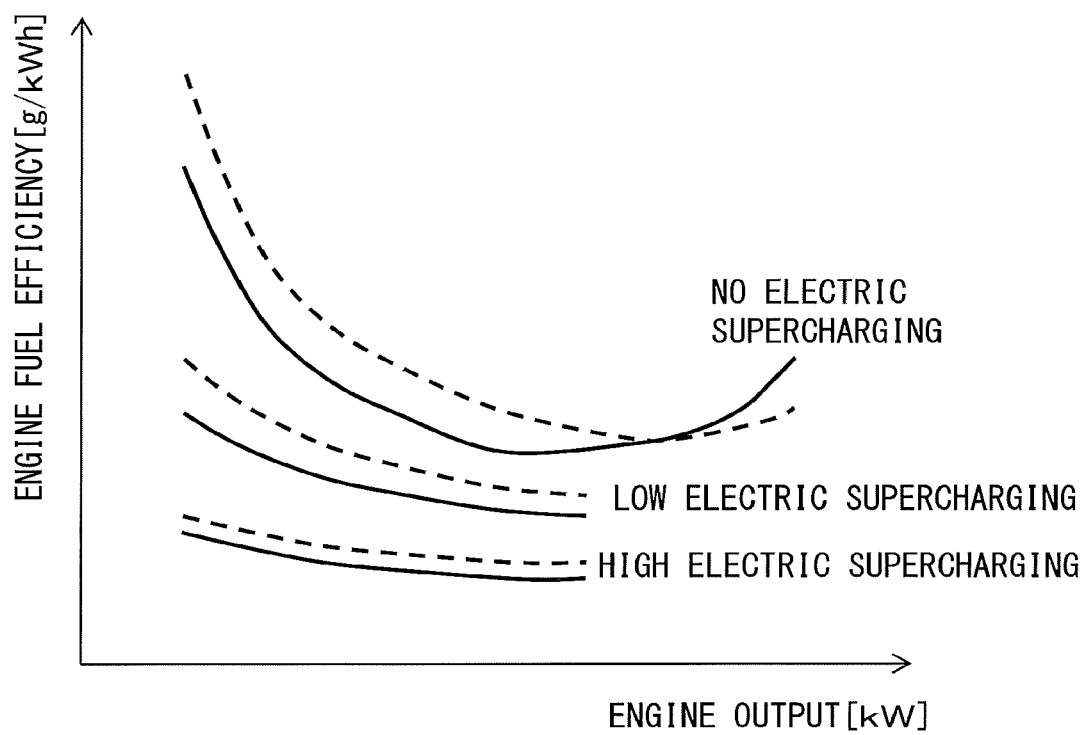
FIG. 10 is a view showing the relationship between the engine output, the degree of supercharging the electric supercharger, and the fuel efficiency of the internal combustion engine.

FIG. 10 is a view showing the relationship between the engine output, the degree of supercharging by electric supercharger 54, and the fuel efficiency of the internal combustion engine 10. The dashed lines in the drawing indicate the cases in which the flow rate of the intake gas is low, and the solid lines in the drawing indicate the cases in which the flow rate of the intake gas is high.

As can be understood from FIG. 10, when the flow rate of the intake gas is high, the change in the fuel efficiency of the internal combustion engine 10 when the degree of supercharging by the electric supercharger 54 changes is small, as compared to when the flow rate of the intake gas is low. This is because when the flow rate of the intake gas is high, even if supercharging is performed by the electric supercharger 54, the pressure of the intake gas is unlikely to rise.

When the flow rate of the intake gas increases, the fuel save rate is calculated based on the relationship represented by the dashed lines in FIG. 10. As described above, when the flow rate of the intake gas is high, even if the electric power supply amount to the electric supercharger 54 changes and thus the degree of supercharging by the electric supercharger 54 changes, the change in the fuel save rate of the internal combustion engine 10 is small, and therefore, increasing the electric power supply amount to the electric supercharger 54 is not particularly effective. Thus, at the operating point ultimately calculated based on the above searching, when the flow rate of the intake gas is high, the ratio of the electric power supply amount to the motor-generators 12 and 14 with respect to the electric power supply amount to the electric supercharger 54 increases.

Furthermore, the relationship when the degree of constant volume is reduced is similar to the relationship when the flow rate of the intake gas is low. Thus, the relationship between the engine output, the degree of supercharging by the electric supercharger 54, and the fuel efficiency of the internal combustion engine 10 when the degree of constant volume is reduced is similar to the relationship represented by the dashed lines in FIG. 10. In other words, when the degree of constant volume is reduced, the change in fuel efficiency of the internal combustion engine 10 when the degree of supercharging by the electric supercharger 54 changes, is small, compared to when the degree of constant volume is large. The reason for this is considered as described below. When the degree of constant volume is reduced, the exhaust energy increases, and as a result, supercharging is performed by the exhaust turbocharger 70. Thus, the supercharging effect achieved by using the electric supercharger 54 is decreased. Therefore, at the operating point ultimately calculated based on the above searching, when the degree of constant volume is reduced, the ratio of the electric power supply amount to the motor-generators 12 and 14 with respect to the electric power supply amount to the electric supercharger 54 is increased, as in the case in which the flow rate of the intake gas increases.

Figure 11:
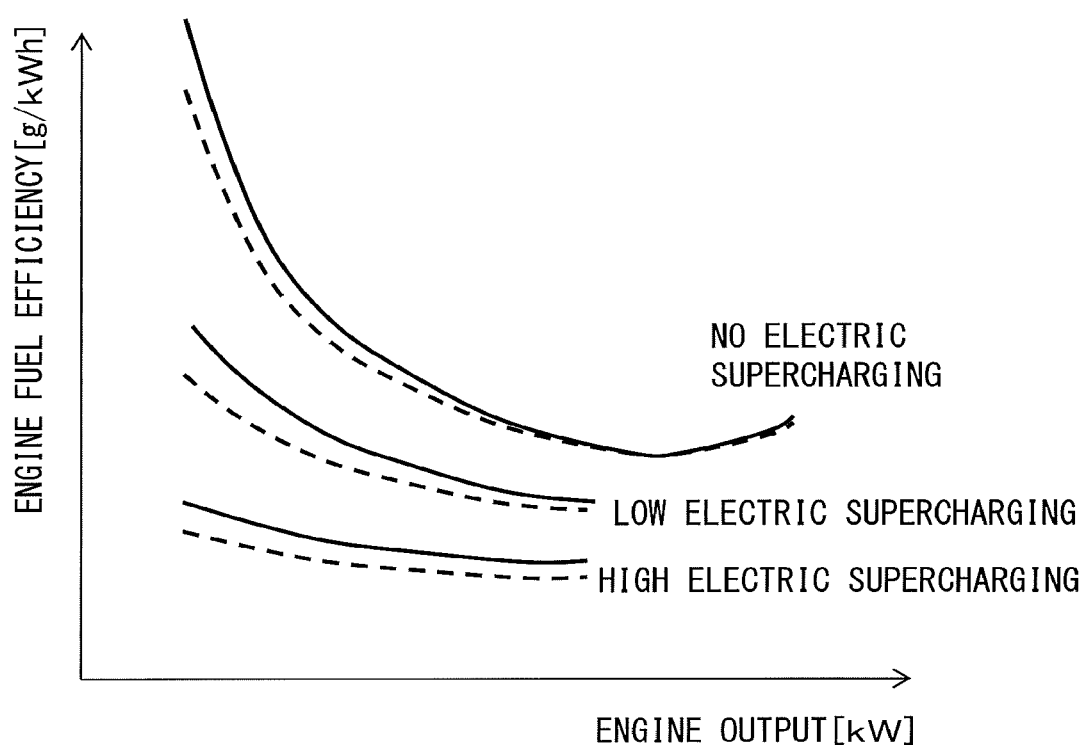
FIG. 11 is a view, similar to FIG. 10, showing the relationship between the engine output, the degree of supercharging the electric supercharger, and the fuel efficiency of the internal combustion engine.

FIG. 11 is a view, similar to FIG. 10, showing the relationship between the engine output, the degree of supercharging by the electric supercharger 54, and the fuel efficiency of the internal combustion engine 10. The dashed lines in the drawing represent the cases in which the pumping loss is large, and the solid lines in the drawing represent the cases in which the pumping loss is small.

As can be understood from FIG. 11, when the pumping loss is large, the change in fuel efficiency of the internal combustion engine 10 when the degree of supercharging by the electric supercharger 54 changes is large, compared to when the pumping loss is small. This is because the larger the pumping loss when the supercharger 54 does not perform supercharging, the higher the thermal efficiency in the internal combustion engine 10 when supercharging is performed by the electric supercharger 54.

When pumping loss is large, fuel save rate can be calculated based on the relationship represented by the dashed lines in FIG. 11. As described above, if the pumping loss is large, the change in the fuel efficiency of the internal combustion engine 10, when the electric power supply amount to the electric supercharger 54 changes and thus the degree of supercharging by the electric supercharger 54 changes, is large, and thus, increasing the electric power supply amount to the electric supercharger 54 is effective. Thus, at the operating point ultimately calculated based on the aforementioned searching, when the pumping loss is large, the ratio of the electric power supply amount to the motor-generators 12 and 14 with respect to the electric power supply amount to the electric supercharger 54 is small.

Figure 12:
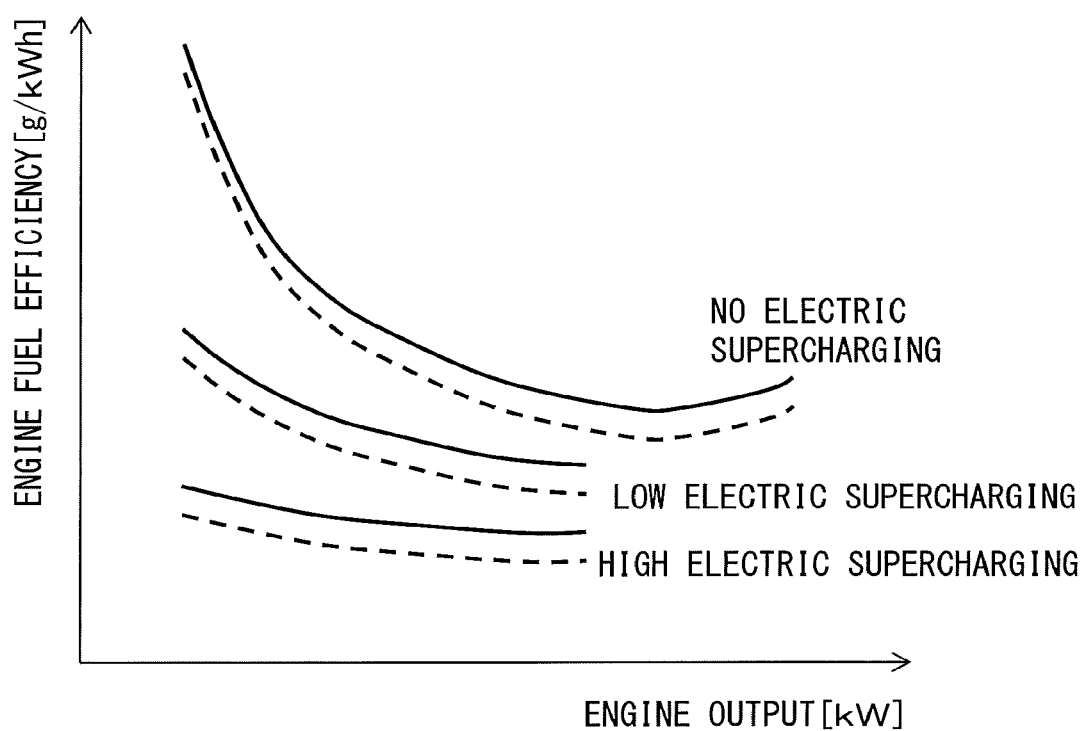
FIG. 12 is a view, which is similar to FIGS. 10 and 11, showing the relationship between the engine output, the degree of supercharging the electric supercharger, and the fuel efficiency of the internal combustion engine.

FIG. 12 is a view, similar to FIGS. 10 and 11, showing the relationship between the engine output, the degree of supercharging by the electric supercharger 54, and the fuel efficiency of the internal combustion engine 10. The dashed lines in the drawing represent the cases in which the friction in the internal combustion engine 10 is large and the solid lines in the drawing represent the cases in which the friction is small.

As can be understood from FIG. 12, when the friction is large, the fuel efficiency of the internal combustion engine 10 is deteriorated, compared to when the friction is small. Thus, the relationship between the engine output and the fuel efficiency of the internal combustion engine 10 shown in FIG. 12 shifts upwards as a whole as the friction increases.

However, the percentage of change of the fuel efficiency of the internal combustion engine 10 with respect to the change in the degree of supercharging by the electric supercharger 54 and the percentage of change of the fuel efficiency of the internal combustion engine 10 with respect to the change of the engine output basically do not change, even if the friction changes. Thus, at the operating point ultimately calculated based on the aforementioned searching, even if friction changes, the ratio of the electric power supply amount to the motor-generators 12 and 14 with respect to the electric power supply amount to the electric supercharger 54 does not change.

<Specific Control>

Figure 13:
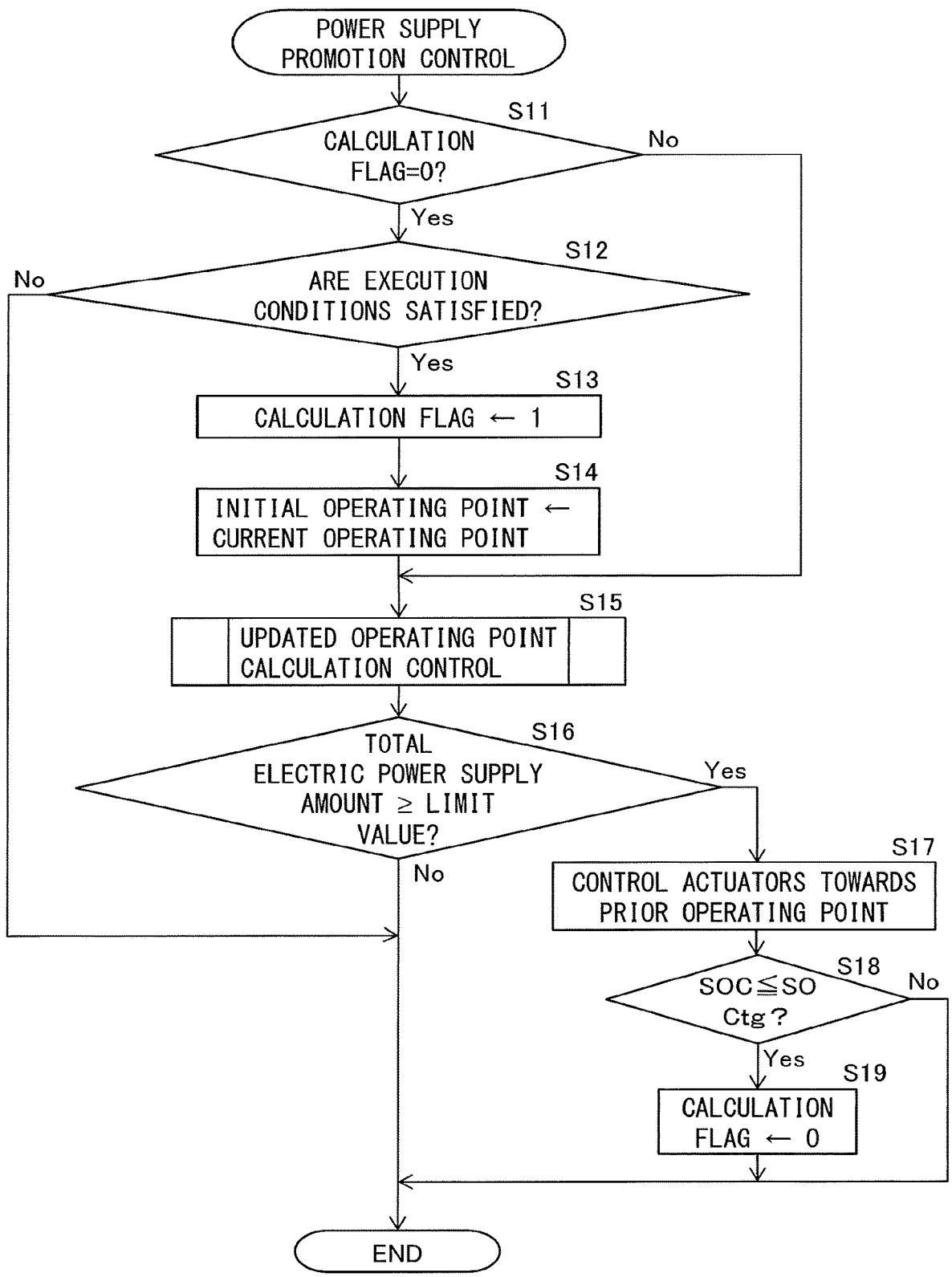
FIG. 13 is a flowchart showing a control routine of electric power supply promotion control for increasing the total electric power supply amount from the battery.

Next, control of the hybrid vehicle 1 will be described with reference to FIGS. 13 and 14. FIG. 13 is a flowchart showing a control routine of electric power supply promotion control in which the total electric power supply amount from the battery 20 is increased. The illustrated control routine is executed at regular time intervals.

First, in step S11, it is determined whether or not a calculation flag is set to zero. The calculation flag is a flag which is set to one when the updated operating point has been calculated and which is set to zero at all other times. When updated operating point has not been calculated, and thus the calculation flag is set to zero, the routine proceeds to step S12. In step S12, it is determined whether or not the execution conditions for electric power supply promotion control in which the total electric power supply is increased are satisfied, i.e., it is determined whether or not it is necessary to increase the total electric power supply amount from the battery 20.

The execution conditions of the electric power supply promotion control are satisfied when, for example, it is expected that the hybrid vehicle 1 will travel downhill in a state in which SOC is high and thus fuel efficiency will be deteriorated. Specifically, first, the SOC of the battery 20 is detected by the PCU 18. Additionally, it is detected by a navigation system (not shown) connected to the ECU 30 whether or not there is a downhill slope in the travelling route of the hybrid vehicle 1 in the near feature, and if there is a downhill slope, the length, slope, etc., thereof are detected. Further, when the detected SOC is equal to or greater than the reference threshold, it is determined that the execution conditions of the electric power supply promotion control are satisfied. The reference threshold value is changed based on, for example, the length of the downhill slope, the slope angle of the downhill slope, etc.

Furthermore, when the required torque of the hybrid vehicle 1 is less than the predetermined value Te1, the execution conditions of the electric power supply promotion control are not satisfied. When the required torque of the hybrid vehicle 1 is less than the predetermined value Te1, the internal combustion engine 10 may be stopped and the hybrid vehicle 1 may be driven by only the motor-generators 12 and 14.

In step S12, when it is determined that the execution conditions of the electric power supply promotion control have not been satisfied, the control routine ends. On the other hand, when it is determined that the execution conditions of the electric power supply promotion control have been satisfied, the routine proceeds to step S13. In step S13, the calculation flag is set to one. Next, in step S14, the current operating point is set as the initial operating point. Specifically, the current operating point is calculated based on, for example, output signal of the ECU 30.

Figure 14:
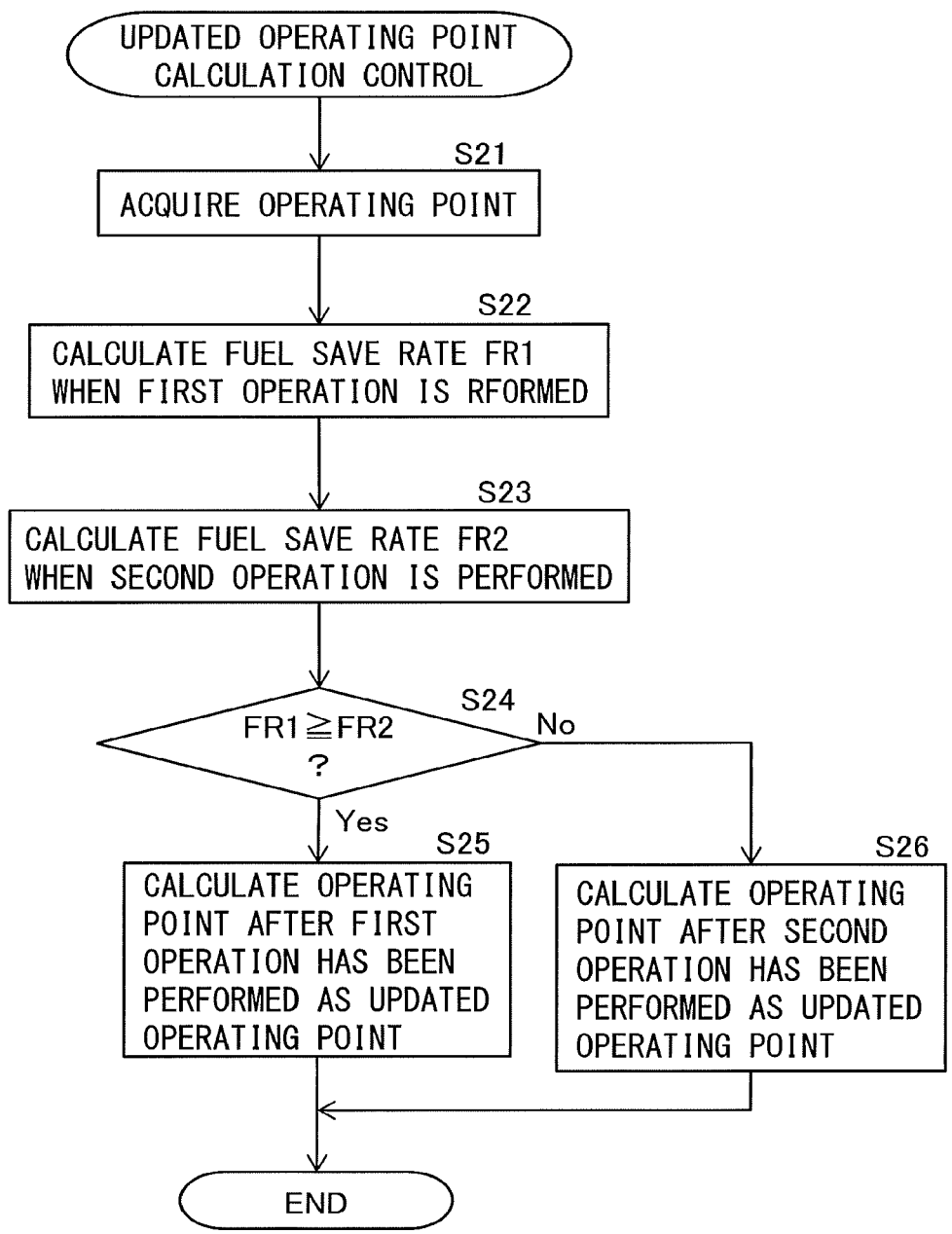
FIG. 14 is a flowchart showing the control routine of updated operating point calculation control which is performed during the electric power supply promotion control shown in FIG. 13.

Next, in step S15, the updated operating point calculation control shown in FIG. 14 is executed and thus the updated operating point is calculated. Next, in step S16, it is determined whether or not the total electric power supply amounts to the motor-generators 12 and 14 and the electric supercharger 54 at the updated operating point are equal to or greater than a predetermined limit value. The limit value is set to an electric power supply amount such that the discharge current from the battery 20 increases to reach the current limit value. In step S16, when it is determined that the total electric power supply amount is less than the limit value, the control routine ends.

In the next control routine, it is determined that the calculation flag was not set to zero in step S11, and thus the routine proceeds to step S15. In step S15, a further updated operating point is calculated by the updated operating point calculation control based on the updated operating point calculated in the prior control routine. Next, in step S16, it is determined whether or not the total electric power supply amount is equal to or greater than the predetermined limit value, and when it is determined that the amount is less than the limit value, the control routine ends.

When the control routine is repeatedly executed and the updated operating point calculation control is repeatedly executed in this way, the total electric power supply amount gradually increases and eventually exceeds limit value. In the control routine in which the total electric power supply amount is equal to or greater than the limit value, it is determined in step S16 that the total electric power supply amount is equal to or greater than the predetermined limit value, and the routine proceeds to step S17.

In step S17, the updated operating point prior to the updated operating point calculated by the updated operating point calculation control in the current control routine (the operating point input to the updated operating point calculation control in step S15 of the current control routine), i.e., the prior updated operating point, is set as the target operating point. The electric power supply amount to the motor-generators 12 and 14, the electric power supply amount to the electric supercharger 54, the target fuel supply amount of the internal combustion engine 10, etc., are controlled so that the operating point becomes the target operating point.

Next, in step S18, it is determined whether or not the current SOC of the battery 20 is equal to or less than a target SOCtg. The current SOC is calculated by, for example, the PCU 18. Furthermore, the target SOCtg is determined based on the free capacity required for the battery 20. For example, the target SOCtg is set so as to be small so that the free capacity of the battery 20 is larger as the slope on which the hybrid vehicle 1 travels is longer. In step S18, when it is determined that the SOC is larger than the target SOCtg, the control routine ends. Thus, in the next control routine, the updated operating point is again calculated by the updated operating point calculation control.

When it is determined in step S18 that the SOC is equal to or less than the target SOCtg, the routine proceeds to step S19. In step S19, the calculation flag is set to zero and the control routine ends.

FIG. 14 is a flowchart showing the control routine of the updated operating point calculation control performed during the electric power supply promotion control shown in FIG. 13. The illustrated control routine is executed each time the control routine of FIG. 13 reaches step S15.

First, in step S21, the operating point is acquired. In the first update operating point calculation control after the calculation flag has been set to one in the control routine of FIG. 13, the operating point acquired at this time is the initial operating point set in step S14 of FIG. 13. On the other hand, in the second or subsequent updated operating point calculation control after the calculation flag has been set to one, the operating point acquired at this time is the updated operating point calculated in step S15 of the prior control routine of the electric power supply promotion control.

Next, in step S22, the fuel save rate FR1 when the first operation is performed is calculated. The procedure for calculating the fuel save rate FR1 when the first operation is performed is described by referring to an example in the case in which the operation point prior to the first operation is the operation point A in FIGS. 6A and 8 and the operation point after the first operation is the operating point B in FIGS. 6A and 8.

First, the change ΔQ in the electric power supply amount to the motor-generators 12 and 14 at operating point A and operating point B is set. This change ΔQ in the electric power supply amount is a predetermined constant value. Next, the engine output $EP_A$ at operating point A and the fuel efficiency $FC_A$ at operating point A are calculated. The engine output $EP_A$ at operating point A is calculated by multiplying the current engine speed of the internal combustion engine 10 and the fuel supply amount (i.e., the engine torque) to the internal combustion engine 10 per cycle at operating point A. Furthermore, the fuel efficiency FC for each operating point is calculated by, for example, the method shown below.

Figure 15:
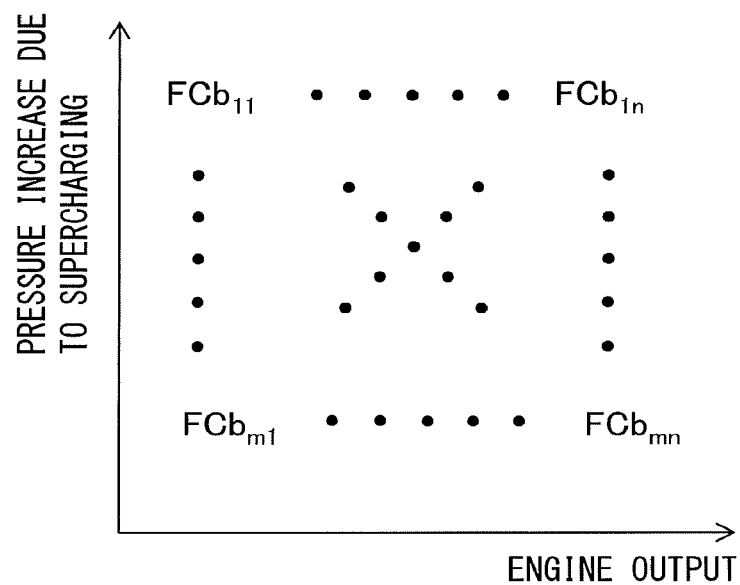
FIG. 15 shows a map used when calculating the fuel efficiency of the internal combustion engine at each of the operating points.

First, the baseline fuel efficiency FCb of the internal combustion engine 10 is calculated based on the engine output and the pressure increase amount by the supercharging by the electric supercharger 54, using a map as shown in FIG. 15. The pressure increase amount by the supercharging of the electric supercharger is calculated based on the electric power supply amount to the electric supercharger 54, the engine output, etc. A map showing the relationship between the engine load, the pressure increase amount and the baseline fuel efficiency FCb as shown in FIG. 15 is calculated in advance experimentally or by calculation, based on the relationship as shown in FIG. 8, and is stored in the ROM of the ECU 30. Note that the map shown in FIG. 15 may be, for example, a multi-dimensional map in which engine speed is further added as a parameter.

Figure 16:
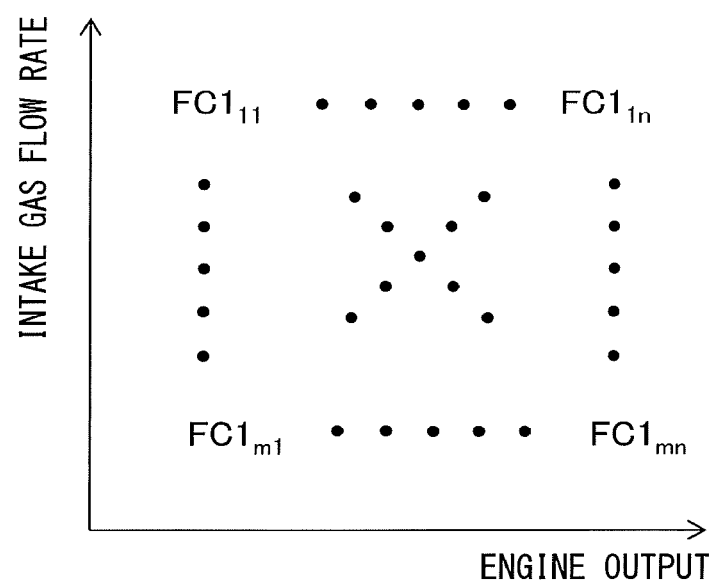
FIG. 16 shows a map used for calculating the fuel efficiency of the internal combustion engine at each of the operating points.

Next, a first fuel efficiency correction value FC1 is calculated, based on the engine output and the flow rate of the intake gas, using a map as shown in FIG. 16. The flow rate of the intake gas is calculated based on, for example, the output of the airflow meter 75 provided in the intake passage of the internal combustion engine 10. A map showing the relationship between the engine load, the flow rate of the intake gas, and the first fuel efficiency correction value FC1 as shown in FIG. 16 is calculated in advance experimentally or by calculation, based on a relationship as shown in FIG. 10, and is stored in the ROM of the ECU 30. Note that the map shown in FIG. 16 may be, for example, a multi-dimensional map in which engine speed or a pressure increase amount by the supercharging of the electric supercharger 54 is further added as a parameter.

Figure 17:
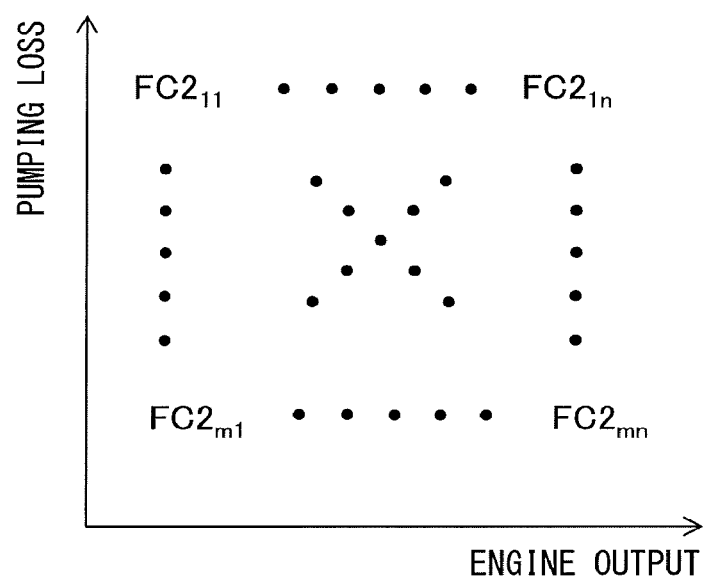
FIG. 17 shows a map used for calculating the fuel efficiency of the internal combustion engine at each of the operating points.

Additionally, a second fuel efficiency correction value FC2 is calculated, based on the engine output and the pumping loss, using a map as shown in FIG. 17. The pumping loss is calculated based on, for example, the cylinder pressures during the intake stroke and during the exhaust stroke detected by sensors (not shown) for detecting the cylinder pressures of the internal combustion engine 10. A map showing the relationship between engine load, pumping loss, and the second fuel efficiency correction value FC2 as shown in FIG. 17 is calculated in advance experimentally or by calculation, based on a relationship as shown in FIG. 11, and is stored in the ROM of the ECU 30. Note that the map shown in FIG. 17 may be, for example, a multi-dimensional map in which the engine speed or the pressure increase amount by the supercharging by the electric supercharger 54 is further added as a parameter.

Figure 18:
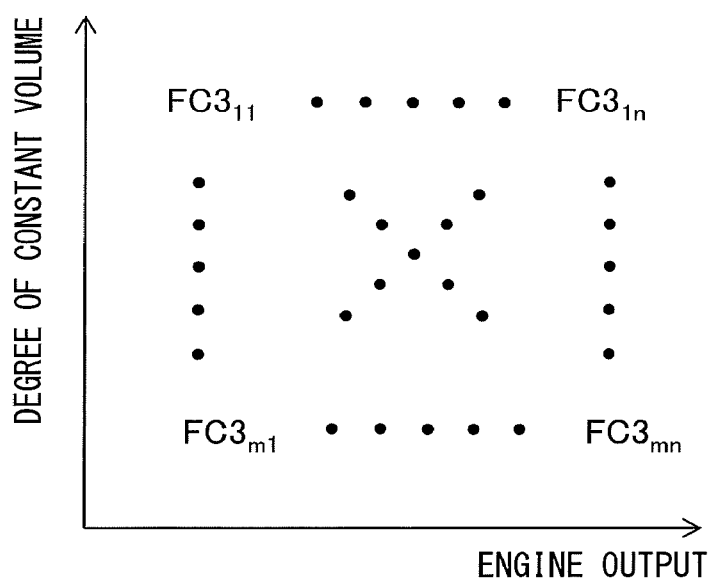
FIG. 18 shows a map used for calculating the fuel efficiency of the internal combustion engine at each of the operating points.

Further, a third fuel efficiency correction value FC3 is calculated, based on the engine output and the degree of constant volume, using a map as shown in FIG. 18. The degree of constant volume is calculated based on, for example, the transition of cylinder pressures from the intake stroke to the compression stroke detected by the sensors (not shown) for detecting the cylinder pressures of the internal combustion engine 10. A map showing the relationship between the engine load, the degree of constant volume, and the third fuel efficiency correction value FC3 as shown in FIG. 18 is calculated in advance experimentally or by calculation based on a relationship as shown in FIG. 10. Note that the map shown in FIG. 18 may be a multi-dimensional map in which the engine speed or the pressure increase amount by the supercharging of the electric supercharger 54 is further added as a parameter.

Further, the fuel efficiency FC of the internal combustion engine 10 is calculated by adding the first fuel efficiency correction value FC1, the second fuel efficiency correction value FC2, and the third fuel efficiency correction value FC3 to the baseline fuel efficiency FCb calculated in this manner (FC=FCb+FC1+FC2+FC3).

The fuel consumption $F_A$ at operating point A is calculated by multiplying the fuel efficiency $FC_A$ at operating point A calculated by such a method by the engine output $EP_A$ at operating point A ($F_A=FC_A \times EP_A$). Likewise, the fuel consumption $F_B$ at operating point B is calculated by multiplying the fuel efficiency $FC_B$ at operating point B by the engine output $EP_B$ at operating point B ($F_B=FC_B \times EP_B$). Further, the decrease ΔF in fuel consumption according to the movement of the operating point from A to B is calculated by subtracting the fuel consumption $F_B$ at operating point B from the fuel consumption $F_A$ at operating point A ($\Delta F=F_A-F_B$). Further, the fuel save rate when the operating point moves from A to B, i.e., the fuel save rate FR 1 when the first operation is performed, is calculated by dividing the decrease ΔF in fuel consumption by the change ΔQ in electric power supply amount (FR1=ΔF/ΔQ).

Next, in step S23, the fuel save rate FR2 when the second operation is performed is calculated. The procedure for calculating the fuel save rate FR2 when the second operation is performed is described by referring to an example in the case in which the operation point prior to the second operation is the operation point A in FIGS. 7A and 8 and the operation point after the second operation is the operating point C in FIGS. 7A and 8.

First, the change ΔQ in the electric power supply amount to the electric supercharger at operating point A and operating point C is set. This change ΔQ in electric power supply amount is a constant value determined in advance. Next, the decrease ΔF in fuel consumption due to the movement of the operating point from A to C is calculated in a similar manner to in step S22. Further, the fuel save rate when the operating point moves from A to C, i.e., the fuel save rate FR2 when the second operation is performed, is calculated by dividing the decrease ΔF in fuel consumption by the change ΔQ in electric power supply amount (FR2=ΔF/ΔQ).

Next, in step S24, it is determined whether or not the fuel save rate FR1 of the first operation calculated in step S22 is equal to or higher than the fuel save rate FR2 of the second operation calculated in step S23. If it is determined, in step S24, that FR2 is equal to or higher than FR2, the routine proceeds to step S25. In step S25, the operating point reached after the first operation is performed from the operating point acquired in step S21 is calculated as an updated operating point, and the control routine ends.

On the other hand, if it is determined, in step S24, that FR1 is less than FR2, the routine proceeds to step S26. In step S26, the operating point reached after the second operation has been performed from the operating point acquired in step S21 is calculated as an updated operating point, and the control routine ends.

Modification Example

In the above embodiment, the target operating point is calculated by searching on the ECU 30. However, it is not necessary to calculate the target operating point by searching. For example, the target operating point may be calculated based on a multi-dimensional map based on engine output, engine speed, the flow rate of the intake gas, pumping loss, and the degree of constant volume. In this case, the target operating point is calculated to maximize the fuel save rate from the current operating point.

However, if the target operating point is calculated based on a map having many parameters without calculating by searching the target operating point, the number of man-hour for conformance process required to create the map is significant, and the data to be stored in the ROM of the ECU 30 grows significantly.

The invention claimed is:

1. A hybrid vehicle comprising an internal combustion engine and an electric motor as power sources, the hybrid vehicle further comprising:
- an electric supercharger for supercharging intake gas supplied to the internal combustion engine;
- a battery which is connected to the electric motor and the electric supercharger and which supplies electric power to the electric motor and the electric supercharger; and
- a controller for controlling the internal combustion engine, the electric motor, and the electric supercharger, wherein
  - the controller is configured to determine whether to increase a total power supply amount from the battery to the electric motor and the electric supercharge, based on a state of charge of the battery, and when it is determined to increase the total power supply amount from the battery, the controller is configured to perform power supply promotion control to increase the total power supply amount from the battery,
  - in the power supply promotion control, the controller is configured to control a power supply amount to the electric motor and a power supply amount to the electric supercharger so as to maximize fuel save rate, which is a percentage of a reduction in fuel consumption of the internal combustion engine relative to the increase of the total power supply amount from the battery, and
  - in the power supply promotion control, the controller is configured to:
    - calculate a first fuel save rate in a case in which a first operation is performed, wherein in the first operation, an output torque of the hybrid vehicle is maintained while the power supply amount to the electric motor is increased and a fuel supply amount to the internal combustion engine is decreased, as compared to when an operating point determined from at least the power supply amount to the electric supercharger, the power supply amount to the electric motor, and the fuel supply amount to the internal combustion engine is at a certain operating point, and a second fuel save rate in a case in which a second operation is performed, wherein in the second operation an output torque of the internal combustion engine is maintained while the power supply amount to the electric supercharger is increased and the fuel supply amount to the internal combustion engine is decreased, as compared to when the operating point is at the certain operating point;
    - execute updated operating point calculation control only once or a plurality of times to calculate a point to which the operating point reaches when the operation, in which the calculated first or second fuel save rate is greatest, is executed as an updated operating point; and
    - control the electric motor, the electric supercharger, and the internal combustion engine so as to achieve the power supply amount to the electric motor, the power supply amount to the electric supercharger, and the fuel supply amount to the internal combustion engine at the updated operating point.

2. The hybrid vehicle according to claim 1, wherein in the power supply promotion control, updated operating point calculation control is repeatedly executed until the total power supply amount from the battery at the updated operating point exceeds a limit value, and the internal combustion engine, the electric motor, and the electric supercharger are controlled to achieve a power supply amount to the electric supercharger, a power supply amount to the electric motor, and a fuel supply amount to the internal combustion engine at an operating point one operating point prior to the ultimately calculated updated operating point.

3. The hybrid vehicle according to claim 1, wherein the controller is configured to stop the internal combustion engine and drive the hybrid vehicle by only the electric motor when a required torque of the hybrid vehicle is not greater than a predetermined value.

4. The hybrid vehicle according to claim 2, wherein the controller is configured to stop the internal combustion engine and drive the hybrid vehicle by only the electric motor when a required torque of the hybrid vehicle is not greater than a predetermined value.

\* \* \* \* \*